United States Patent
Grabner et al.

(10) Patent No.: US 11,361,505 B2
(45) Date of Patent: Jun. 14, 2022

(54) MODEL RETRIEVAL FOR OBJECTS IN IMAGES USING FIELD DESCRIPTORS

(71) Applicant: QUALCOMM Technologies, Inc., San Diego, CA (US)

(72) Inventors: Alexander Grabner, Graz (AT); Peter Michael Roth, Mooskirchen (AT); Vincent Lepetit, Talence (FR)

(73) Assignee: QUALCOMM Technologies, Inc., San Diego, CA (US)

( * ) Notice: Subject to any disclaimer, the term of this patent is extended or adjusted under 35 U.S.C. 154(b) by 119 days.

(21) Appl. No.: 16/655,174

(22) Filed: Oct. 16, 2019

(65) Prior Publication Data
US 2020/0388071 A1 Dec. 10, 2020

Related U.S. Application Data

(60) Provisional application No. 62/858,268, filed on Jun. 6, 2019.

(51) Int. Cl.
*G06T 17/20* (2006.01)
*G06K 9/62* (2022.01)
(Continued)

(52) U.S. Cl.
CPC ............ *G06T 17/20* (2013.01); *G06K 9/6215* (2013.01); *G06T 7/75* (2017.01); *G06T 19/20* (2013.01);
(Continued)

(58) Field of Classification Search
CPC ......... G06T 17/20; G06T 19/20; G06T 17/00; G06T 2207/20084; G06K 9/00214; G06K 9/6215; G06K 9/6202; G06K 9/00201
See application file for complete search history.

(56) References Cited

U.S. PATENT DOCUMENTS 10,706,321 B1 * 7/2020 Chen ......................... G06T 7/75
2005/0276443 A1 * 12/2005 Slamani ............. G06K 9/00208
382/103
(Continued)

OTHER PUBLICATIONS

Lee et al., "Cross-Domain Image-Based 3D Shape Retrieval by View Sequence Learning," Sep. 2018, IEEE, pp. 258-266 (Year: 2018).*

(Continued)

*Primary Examiner* — Andrew G Yang
(74) *Attorney, Agent, or Firm* — Qualcomm Technologies, Inc.

(57) ABSTRACT

Techniques are provided for one or more three-dimensional models representing one or more objects. For example, an input image including one or more objects can be obtained. From the input image, a location field can be generated for each object of the one or more objects. A location field descriptor can be determined for each object of the one or more objects, and a location field descriptor for an object of the one or more objects can be compared to a plurality of location field descriptors for a plurality of three-dimensional models. A three-dimensional model can be selected from the plurality of three-dimensional models for each object of the one or more objects. A three-dimensional model can be selected for the object based on comparing a location field descriptor for the object to the plurality of location field descriptors for the plurality of three-dimensional models.

30 Claims, 19 Drawing Sheets
(6 of 19 Drawing Sheet(s) Filed in Color)

(51) Int. Cl.
  *G06T 7/73* (2017.01)
  *G06T 19/20* (2011.01)
  *G06V 10/75* (2022.01)
  *G06V 20/64* (2022.01)

(52) U.S. Cl.
  CPC .......... *G06V 10/751* (2022.01); *G06V 20/653* (2022.01); *G06T 2207/20084* (2013.01); *G06T 2219/2016* (2013.01)

(56) References Cited

U.S. PATENT DOCUMENTS

| | | | | |
|---|---|---|---|---|
| 2005/0286767 | A1* | 12/2005 | Hager | G06K 9/00208 382/190 |
| 2009/0034791 | A1* | 2/2009 | Doretto | G06K 9/4614 382/103 |
| 2017/0061252 | A1* | 3/2017 | Burgos | G06K 9/4642 |
| 2017/0185823 | A1* | 6/2017 | Gold | G06F 16/5838 |
| 2017/0304732 | A1* | 10/2017 | Velic | G06K 9/6255 |
| 2018/0182113 | A1* | 6/2018 | Kimura | B60R 21/00 |
| 2018/0204347 | A1* | 7/2018 | Stenborg | G06K 9/628 |
| 2019/0043172 | A1* | 2/2019 | Chui | G06T 15/06 |
| 2019/0087976 | A1* | 3/2019 | Sugahara | G06K 9/6274 |
| 2019/0147642 | A1* | 5/2019 | Cole | G06K 9/00214 345/419 |
| 2019/0156119 | A1* | 5/2019 | Sharma | G06F 3/0317 |
| 2019/0333245 | A1* | 10/2019 | Zhao | G06K 9/00771 |
| 2019/0385352 | A1* | 12/2019 | Varekamp | H04N 13/117 |
| 2020/0250879 | A1* | 8/2020 | Foster | G05D 1/0276 |
| 2020/0265238 | A1* | 8/2020 | Polavarapu | G06K 9/00671 |
| 2021/0295594 | A1* | 9/2021 | Sinha | G06N 3/04 |

OTHER PUBLICATIONS

Grabnera., et al., "Location Field Descriptors: Single Image 3D Model Retrieval in the Wild", 2019 International Conference on 3D Vision (3DV), IEEE, Sep. 16, 2019 (Sep. 16, 2019), pp. 583-593, XP033653341, DOI: 10.1109/3DV.2019.00070 [retrieved on Oct. 28, 2019] the whole document.

International Search Report and Written Opinion—PCT/US2020/025415—ISA/EPO—dated Jun. 15, 2020.

Wang Y., et al., "3D Pose Estimation for Fine-Grained Object Categories", arxiv.org, Cornell University Library, 201 Olin Library Cornell University Ithaca, NY, 14853, Jun. 12, 2018 (Jun. 12, 2018), 14 Pages, XP081426011, the whole document.

Wang Y., et al., "Improving Annotation for 3D Pose Dataset of Fine-Grained Object Categories", arxiv.org, Cornell University Library, 201 Olin Library Cornell University Ithaca, NY, 14853, Oct. 19, 2018 (Oct. 19, 2018), 10 Pages, XP081068662, the whole document.

Lu L., et al., "A Three-Tiered Approach to Articulated Object Action Modeling and Recognition", Neural Information Processing and Systems, Vancouver, B.C. Canada, Dec. 2004, 8 Pages.

* cited by examiner

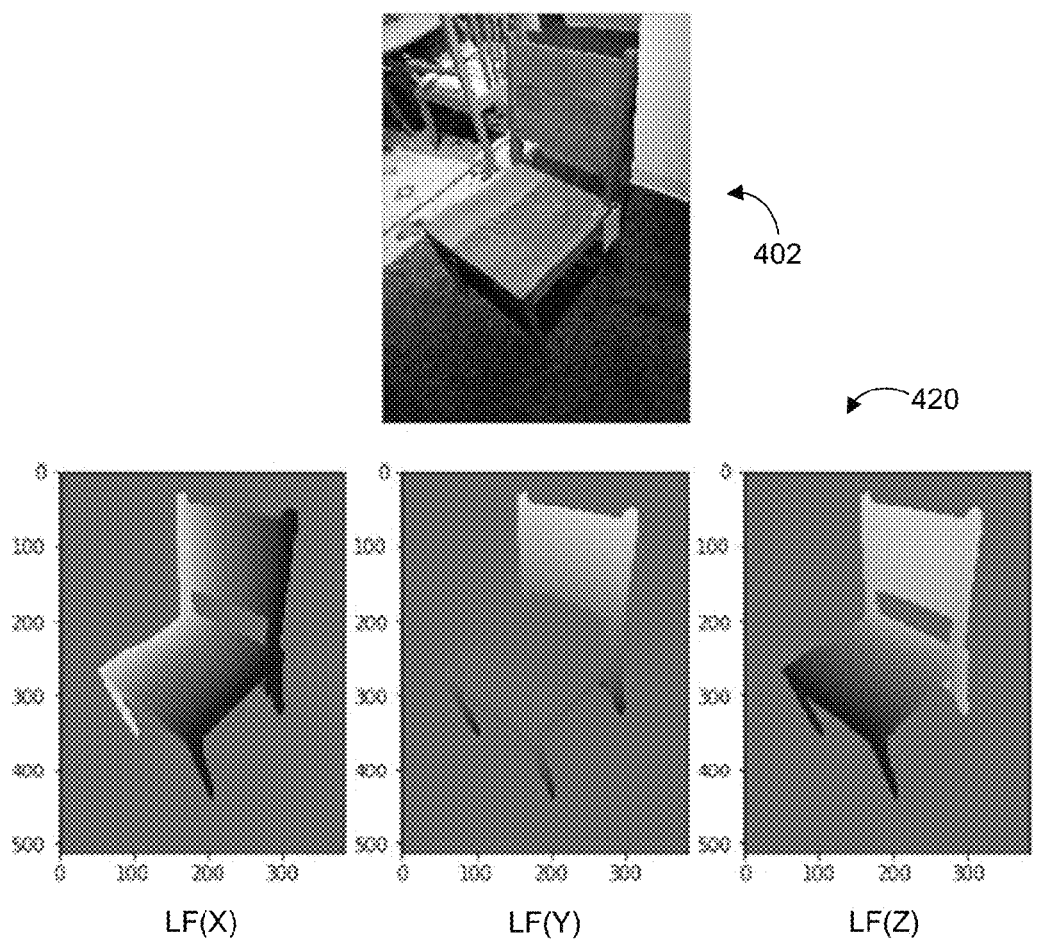
FIG. 4A
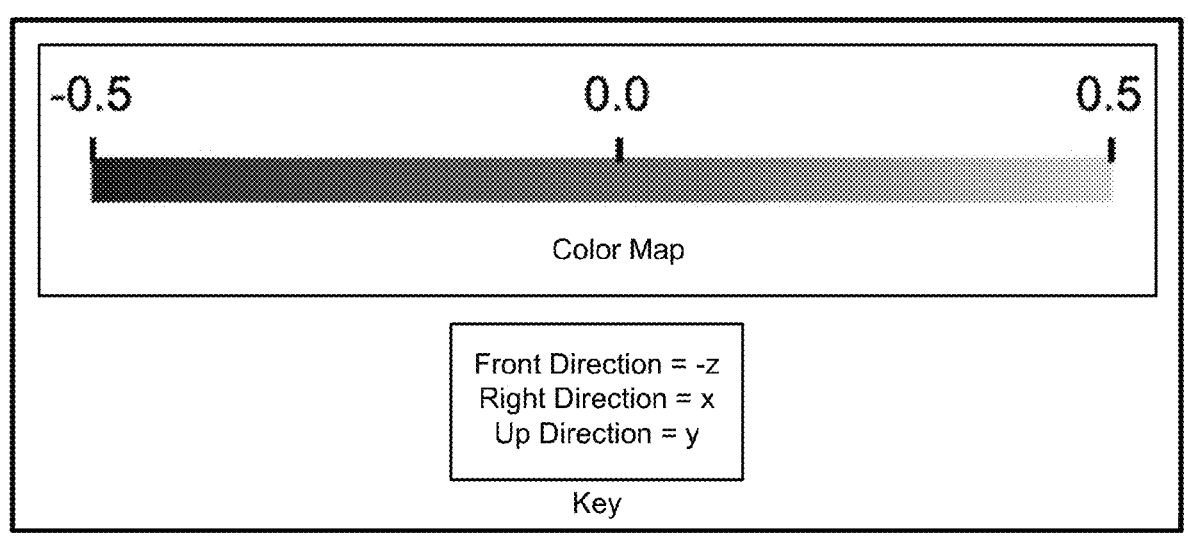

430
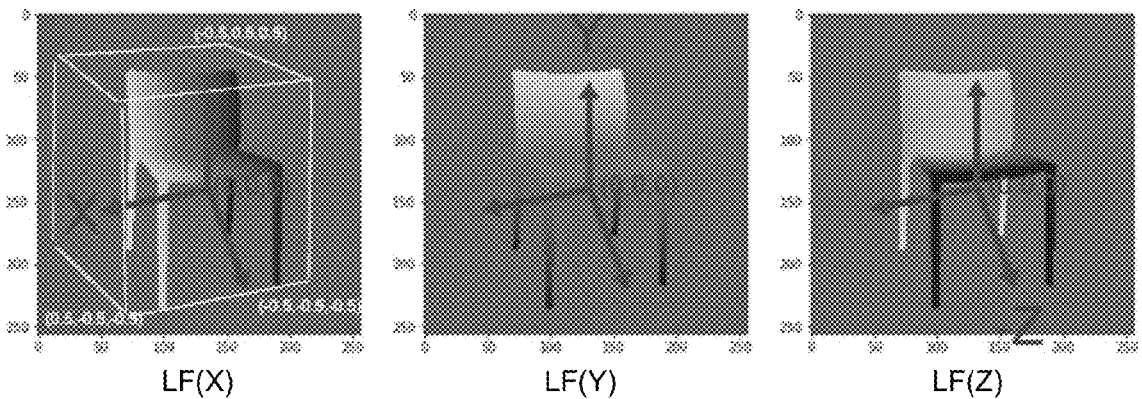
LF(X)  LF(Y)  LF(Z)
FIG. 4B
430
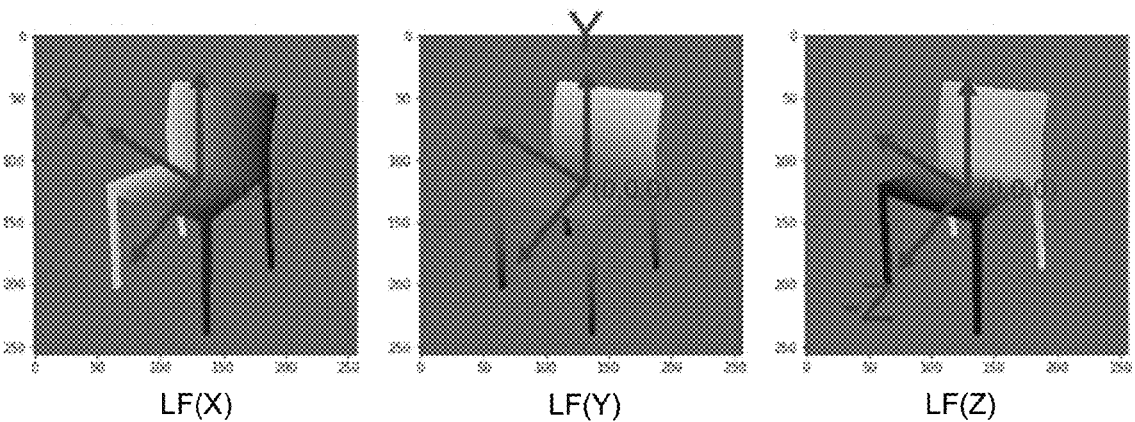
LF(X)  LF(Y)  LF(Z)
FIG. 4C
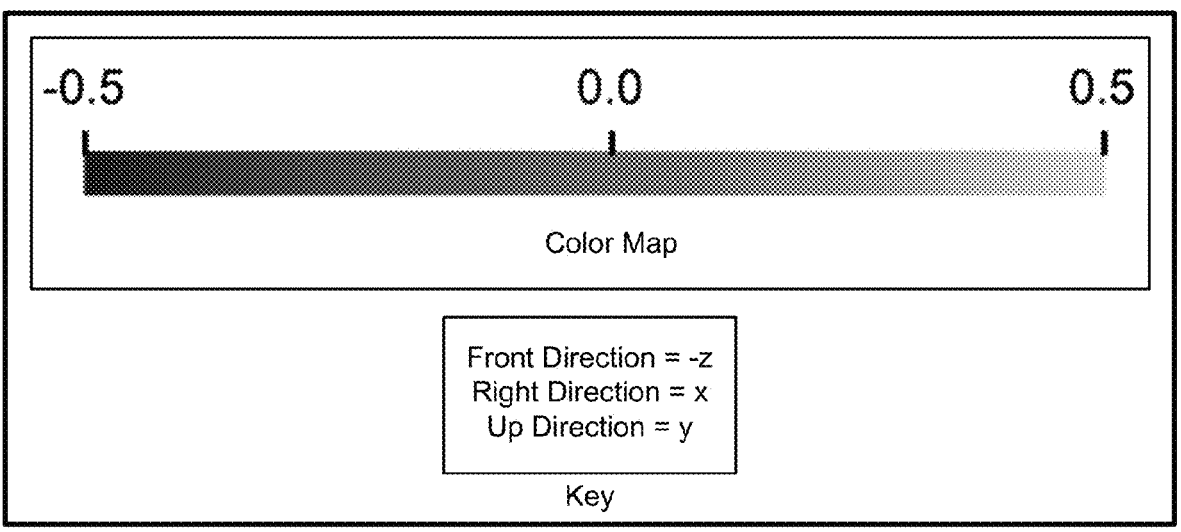

MODEL RETRIEVAL FOR OBJECTS IN IMAGES USING FIELD DESCRIPTORS

CROSS-REFERENCE TO RELATED APPLICATIONS

This application claims the benefit of U.S. Provisional Application No. 62/858,268, filed Jun. 6, 2019, which is hereby incorporated by reference, in its entirety and for all purposes.

FIELD

The present disclosures generally relate to model retrieval for objects in images, and more specifically to determining three-dimensional models for representing objects using field descriptors.

BACKGROUND

Determining objects that are present in real images and attributes of those objects is useful for many applications. For instance, a model can be determined for representing an object in an image, and can be used to facilitate effective operation of various systems. Examples of such applications and systems include augmented reality (AR), robotics, automotive and aviation, three-dimensional scene understanding, object grasping, object tracking, in addition to many other applications and systems.

In AR environments, for example, a user may view images that include an integration of artificial or virtual graphics with the user's natural surroundings. AR applications allow real images to be processed to add virtual objects to the images and to align the virtual objects to the image in multiple dimensions. For instance, a real-world object that exists in reality can be represented using a model that resembles or is an exact match of the real-world object. In one example, a model of a virtual airplane representing a real airplane sitting on a runway may be presented in the view of an AR device (e.g., glasses, goggles, or other device) while the user continues to view his or her natural surroundings in the AR environment. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

SUMMARY

In some embodiments, techniques and systems are described for performing three-dimensional (3D) model retrieval (e.g., in the wild) using location fields and location field descriptors. The techniques and systems can be used to select a 3D model for an object in an image (e.g., a red-green-blue (RGB) image) based on a location field descriptor generated for the object and location field descriptors generated for a plurality of 3D models. In some cases, the 3D model retrieval can be performed using a single image as input.

The techniques described herein establish a common low-level representation in the form of location fields for 3D models and for one or more objects detected in an image. A location field is an image-like representation that encodes a 3D surface coordinate for each object pixel, providing correspondences between 2D pixels and 3D surface coordinates. The location fields for the 3D models can be rendered directly from the 3D models. The location field for an object in an image can be predicted from the image (e.g., using a first convolutional neural network (CNN) or other type of machine learning system).

3D shape descriptors (referred to as "location field descriptors") can then be computed from the location fields. A location field descriptor is a 3D shape descriptor that includes information defining the shape of the object (e.g., an object detected in an image or an object represented by a 3D model). Instead of exhaustively comparing location fields from different viewpoints, pose-invariant 3D location field descriptors can be computed (from the location fields) in an embedding space optimized for retrieval from the location fields. The pose-invariant location field descriptors can be computed using a second CNN or other type of machine learning system.

In one illustrative example, an input image can be obtained, and one or more objects can be detected in the image (e.g., using the first CNN). A location field can be generated for each object of the one or more objects. A location field descriptor can then be generated for each object of the one or more objects (e.g., using the second CNN). A location field descriptor can also be generated for each 3D model of a plurality of 3D models (e.g., using the second CNN). The location field descriptor generated for the object can be compared to the location field descriptors generated for the plurality of 3D models. The 3D model having the location field descriptor that is closest (e.g., based on a distance, such as Euclidean distance or Cosine distance) to the location field descriptor of the object can be selected. An output image can then be generated that includes the selected 3D model rendered with the input image (e.g., the 3D model can replace the two dimensional object in the image).

The 3D model selected for representing an object in an image can be provided for use by any suitable application that can utilize a 3D model (e.g., 3D mesh) for performing one or more operations. In one illustrative example, the selected 3D model can be used by an AR application to represent the object in an AR environment. In other examples, the 3D mesh of the 3D model can be used for 3D scene understanding, object grasping (e.g., in robotics, surgical applications, and/or other suitable applications), object tracking, scene navigation, and/or other suitable applications.

According to at least one example, a method of determining one or more three-dimensional models is provided. The method includes determining a location field descriptor for at least one object of one or more objects in an input image, and comparing the location field descriptor for the at least one object to a plurality of location field descriptors for a plurality of three-dimensional models. The method further includes selecting, from the plurality of three-dimensional models, a three-dimensional model for the at least one object. The three-dimensional model is selected for the at least one object based on comparing the location field descriptor for the at least one object to the plurality of location field descriptors for the plurality of three-dimensional models.

In another example, an apparatus for determining one or more three-dimensional models is provided. The apparatus includes a memory configured to store one or more images and a processor implemented in circuitry and coupled to the memory. The processor is configured to and can determine a location field descriptor for at least one object of one or more objects in an input image, and compare the location field descriptor for the at least one object to a plurality of location field descriptors for a plurality of three-dimensional models. The processor is further configured to and can select, from the plurality of three-dimensional models, a three-dimensional model for the at least one object of the one or more objects. The three-dimensional model is selected for the at least one object based on comparing the location field descriptor for the at least one object to the plurality of location field descriptors for the plurality of three-dimensional models.

In another example, a non-transitory computer readable medium having stored thereon instructions that, when executed by one or more processors, cause the one or more processor to: determine a location field descriptor for at least one object of one or more objects in an input image; compare the location field descriptor for the at least one object to a plurality of location field descriptors for a plurality of three-dimensional models; and select, from the plurality of three-dimensional models, a three-dimensional model for the at least one object, wherein the three-dimensional model is selected for the at least one object based on comparing the location field descriptor for the object to the plurality of location field descriptors for the plurality of three-dimensional models.

In another example, an apparatus for determining one or more three-dimensional models is provided. The apparatus includes means for determining a location field descriptor for at least one object of one or more objects in an input image. The apparatus further includes means for comparing the location field descriptor for the at least one object to a plurality of location field descriptors for a plurality of three-dimensional models. The apparatus further includes means for selecting, from the plurality of three-dimensional models, a three-dimensional model for the at least one object. The three-dimensional model is selected for the at least one object based on comparing the location field descriptor for the at least one object to the plurality of location field descriptors for the plurality of three-dimensional models.

The location field descriptor for the at least one object can be determined from the location field for the at least one object.

In some examples, the three-dimensional model is selected for the at least one object based on the location field descriptor of the at least one object having a closest match with a location field descriptor of the three-dimensional model.

In some examples, comparing the location field descriptor for the at least one object to the plurality of location field descriptors for the plurality of three-dimensional models includes: determining distances between the location field descriptor for the at least one object and the plurality of location field descriptors for the plurality of three-dimensional models.

In some examples, the three-dimensional model is selected for the at least one object based on the location field descriptor of the at least one object having a closest distance with a location field descriptor of the three-dimensional model.

In some examples, the distances include Euclidean distances or Cosine distances.

In some examples, the location field descriptor for the at least one object is based on three-dimensional surface coordinate information for a plurality of pixels associated with the at least one object in the input image.

In some examples, the location field descriptor for the at least one object includes a feature vector with values defining a shape of the at least one object.

In some examples, each three-dimensional model of the plurality of three-dimensional models includes a three-dimensional mesh representing an object.

In some examples, the methods, apparatuses, and computer readable medium described above further comprise: obtaining the plurality of three-dimensional models; and determining the plurality of location field descriptors for the plurality of three-dimensional models, wherein a location field descriptor is determined for each three-dimensional model of the plurality of three-dimensional models.

In some cases, the methods, apparatuses, and computer readable medium described above further comprise generating a location field for a three-dimensional model of the plurality of three-dimensional models by generating a rendering of the three-dimensional model. In some examples, the location field is generated using a first convolutional neural network, where the first convolutional neural network can use the input image as input. In some examples, the methods, apparatuses, and computer readable medium described above further comprise detecting, using the first convolutional neural network, the one or more objects from the input image. In some examples, the location field descriptor for the at least one object is determined using a second convolutional neural network, where the second convolutional neural network can use the location field as input.

In some cases, generating the rendering of the three-dimensional model includes: rasterizing a three-dimensional mesh of the three-dimensional model to determine a three-dimensional surface coordinate for each vertex of the three-dimensional mesh; and interpolating three-dimensional surface coordinates for points between vertices of the three-dimensional mesh.

In some examples, the methods, apparatuses, and computer readable medium described above further comprise generating a plurality of location fields for a three-dimensional model of the plurality of three-dimensional models. A first location field of the plurality of location fields can be generated for a first pose of the three-dimensional model, and a second location field of the plurality of location fields can be generated for a second pose of the three-dimensional model.

In some examples, the methods, apparatuses, and computer readable medium described above further comprise storing the plurality of location field descriptors for the plurality of three-dimensional models in a database.

In some examples, the methods, apparatuses, and computer readable medium described above further comprise determining, for each three-dimensional model of the plurality of three-dimensional models, a pose-invariant center descriptor. In such examples, the plurality of location field descriptors that are compared to the location field descriptor for the at least one object include a plurality of pose-invariant center descriptors. In some cases, the plurality of pose-invariant center descriptors are determined using a convolutional neural network.

In some examples, the methods, apparatuses, and computer readable medium described above further comprise generating an output image based on the selected three-dimensional model and the input image.

In some examples, the methods, apparatuses, and computer readable medium described above further comprise: receiving a user input to manipulate the selected three-dimensional model; and adjusting one or more of a pose, a location, or a property of the selected three-dimensional model in an output image based on the user input.

In some examples, the methods, apparatuses, and computer readable medium described above further comprise: obtaining an additional input image, the additional input image including the at least one object in one or more of a different pose or a different location than a pose or location of the at least one object in the input image; and adjusting one or more of a pose or a location of the selected three-dimensional model in an output image based on a difference between the pose or location of the at least one object in the additional input image and the pose or location of the at least one object in the input image.

In some examples, the apparatus is a mobile device. In some examples, the apparatus includes a camera for capturing one or more images. In some examples, the apparatus includes a display for displaying one or more images.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present application are described in detail below with reference to the below figures:

FIG. 4A is a diagram illustrating an example of a location field generated for an object in an input image, in accordance with some examples;

FIG. 4B and FIG. 4C are diagrams illustrating an example of a location field generated for a 3D model, in accordance with some examples;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
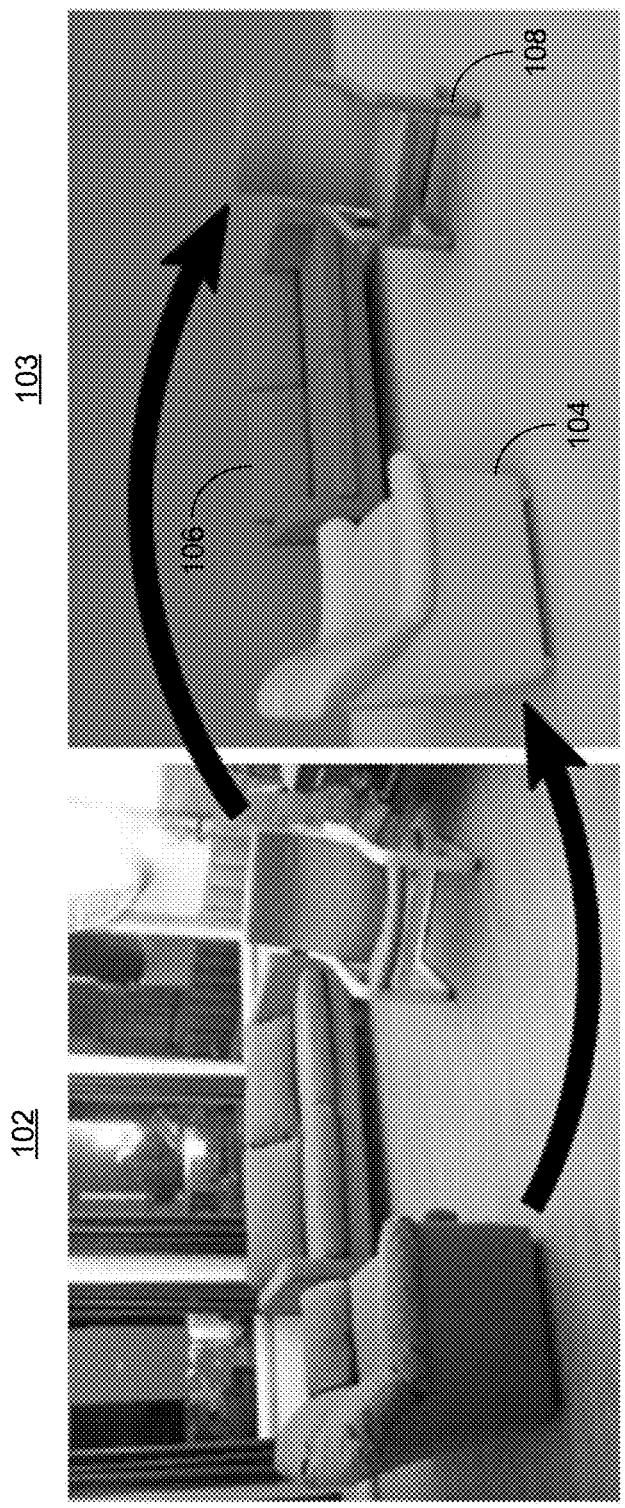
FIG. 1 is diagram illustrating an example of an input image and models retrieved for objects in the input image, in accordance with some examples.

As described herein, methods and systems are described for performing three-dimensional (3D) model retrieval (e.g., in the wild) using location fields and location field descriptors. For example, as shown in FIG. 1, given a single image 102 (e.g., an RGB image) with one or more objects, the methods and systems can retrieve 3D models 104, 106, and 108 with accurate geometry for each object. The retrieved 3D models 104, 106, and 108 can then be provided in an output image 103.

As described in more detail below, the methods and systems can map two-dimensional (2D) images and 3D models to a common descriptor space that is optimized for 3D model retrieval. For example, a descriptor can be computed for each available 3D model. For a given image of an object, a descriptor can be computed from the image. Based on a comparison of the descriptor computed from the image with the descriptors of the 3D models, the 3D model with the most similar descriptor can be selected for the object in the image. It can be a challenge to compute descriptors (for a 3D model and for an image) that are similar when the image contains an object that is similar to an object represented by the 3D model, and dissimilar when the image contains an object that is different than the object represented by the 3D model. The methods and systems described herein resolve this challenge, in part, by computing the descriptors based on location fields, including location fields generated for the 3D models and a location field generated for each object in an image. Such descriptors are referred to herein as location field descriptors.

Retrieving the three-dimensional (3D) shapes of objects from images (especially a single image) can be useful for many applications, such as augmented reality (AR) applications, 3D scene modeling, 3D scene understanding, object grasping, object tracking, robotics, 3D printing, among others. Compared to model reconstruction, 3D model retrieval provides 3D models designed by humans which are rich in detail. Due to the growing number of large-scale 3D model databases (e.g., ShapeNet, 3D Warehouse, among others), efficient image-based model retrieval approaches have become commonplace.

Figure 2:
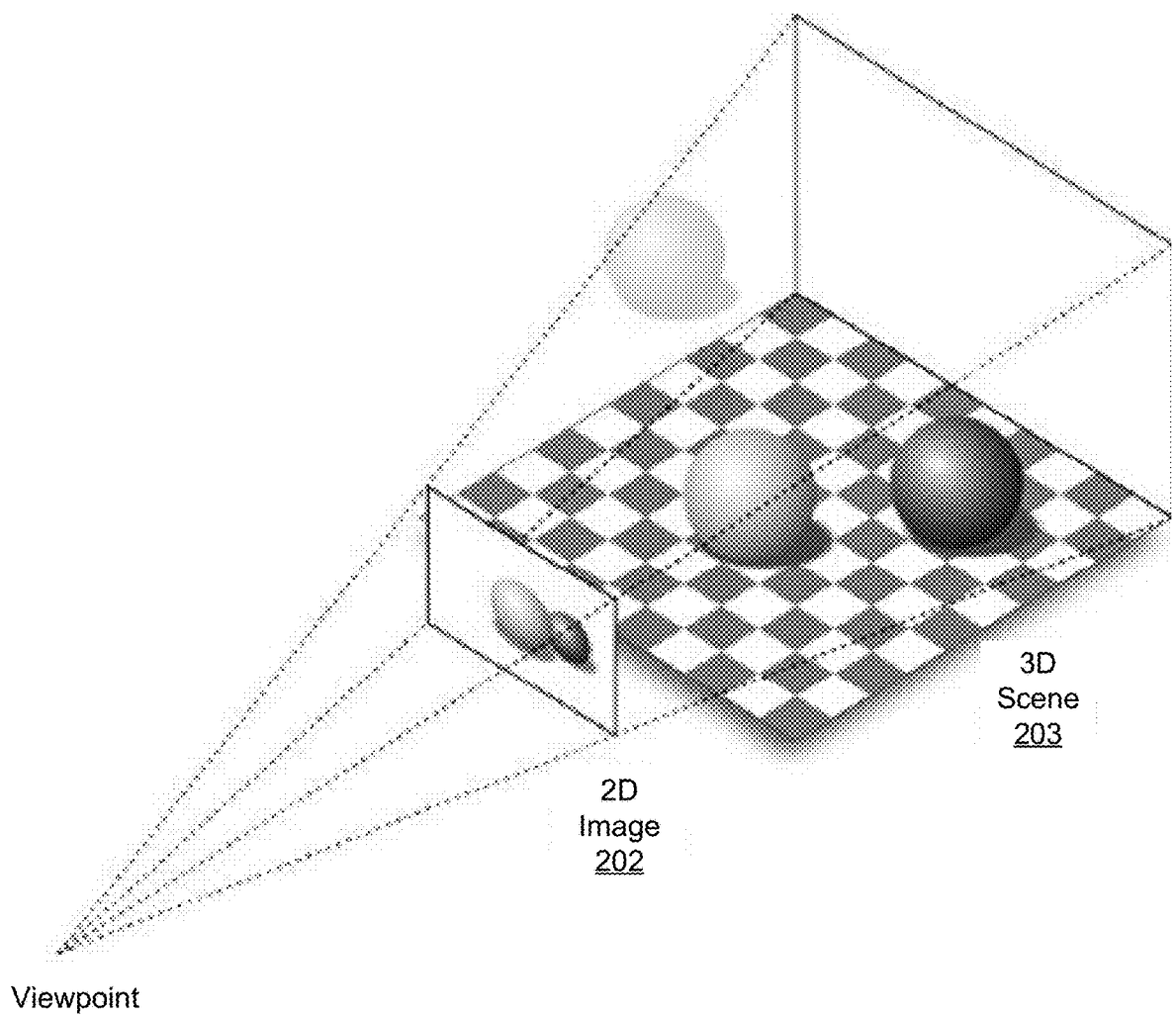
FIG. 2 is a diagram illustrating an example of a projection from a three-dimensional (3D) scene to a two-dimensional (2D) image, in accordance with some examples.

However, inferring a 3D model from 2D observations can be highly difficult. For example, 3D models and color images have very different natures. As shown in FIG. 2, inherent information loss occurs due to projection of a 3D scene 203 to a two-dimensional (2D) image 202. 3D model retrieval can also be difficult due to unknown camera parameters and unknown object poses. Furthermore, training data for training 3D model retrieval machine learning systems is scarce. For instance, there are not many training images with 3D model annotations.

Various techniques can be used for retrieving the 3D shapes of objects. For example, the retrieval task can be addressed by directly mapping 3D models and images (e.g., RGB images) to a common embedding space. However, such a technique can have a number of limitations in practice. For example, the learned mapping is highly prone to overfitting, because training data in the form of RGB images with 3D model annotations is scarce. Further, systems purely trained on synthetic data do not generalize to real data due to the domain gap between RGB images and RGB renderings. Even further, the black box characteristic of these systems makes it hard to understand, why the approaches fail in certain scenarios.

Various techniques can be used in the fields of 3D coordinate regression and 3D model retrieval from a single RGB image. Regressing 3D coordinates from 2D observations is a common problem in computer vision. While some approaches generate 3D point clouds from multi-view RGB images, other approaches predict unstructured 3D point clouds from a single RGB image using deep learning. In some cases, such unstructured 3D point clouds can be used to address various 3D vision tasks with deep learning. As described in more detail below, the techniques described herein predict structured 3D point clouds in the form of location fields. A location field encodes a 3D surface coordinate for each object pixel, and it can be important to know which pixels belong to an object and which pixels belong to the background or another object. Deep learning techniques for instance segmentation can be used to increase the accuracy of location field generation.

Regarding 3D model retrieval, some techniques perform retrieval given a query 3D model. Such techniques either directly operate on 3D data (e.g., in the form of voxel grids, spherical maps, point clouds, or other 3D data), or process multi-view renderings of the query 3D model to compute a shape descriptor. However, as described below, the techniques described herein can be used to perform the much more challenging task of 3D model retrieval from a single image (e.g., an RGB image or other type of image). One approach to retrieve 3D model from a single image is to train a classifier that provides a 3D model for each fine-grained class on top of handcrafted or learned features extracted from the image. Such an approach restricts the retrieval to 3D models seen during training. One way to overcome this limitation is to map 3D models and images to a common embedding space, where model retrieval is performed using distance-based matching (as described below). In this case, the mapping, the embedding space, and the distance measure can be designed in a variety of ways.

In some cases, features extracted from an image can be matched against features extracted from multi-view image renderings to predict both shape and viewpoint. In this context, one approach is to use a convolutional neural network (CNN) trained for ImageNet classification to extract features. In some cases, in addition to using such a CNN, nonlinear feature adaption can be additionally performed to overcome the domain gap between real and rendered images. Another approach is to use a CNN trained for object detection as a feature extractor. However, such a CNN is not optimized for 3D model retrieval.

In some cases, techniques can train mappings to predefined embedding spaces. One approach is to train CNNs to map 3D models, RGB images, depth maps, and sketches to an embedding space based on text for cross-modal retrieval. Another approach is to construct a low-dimensional embedding space by performing principal component analysis (PCA) on 3D key points and map 3D key points predicted using a CNN to that space for retrieval. Another approach is to train a CNN to map RGB images to an embedding space computed from pairwise similarities between 3D models.

Instead of handcrafting an embedding space, an embedding space capturing 3D shape properties can be learned. One approach is to reconstruct voxel grids from RGB images of objects using CNNs. The low-dimensional bottleneck shape descriptor can also be used for retrieval. Another approach is to combine a 3D voxel encoder and an RGB image encoder with a shared 3D voxel decoder to perform reconstruction from a joint embedding. 3D model retrieval can then be performed by matching embeddings of voxel grids against those of RGB images.

In some cases, an embedding space can be explicitly learned that is optimized for 3D model retrieval. One approach is to use a single CNN to map RGB images and RGB renderings to an embedding space that is optimized using a Euclidean distance-based lifted structure loss. At test time, the distances between an embedding of an RGB image and embeddings of multi-view RGB renderings can be averaged to compensate for the unknown object pose. Another approach is to use two CNNs to map RGB images and gray-scale renderings to an embedding space and optimize a Euclidean distance-based Triplet loss. In some cases, cross-view convolutions can be employed to aggregate a sequence of multi-view renderings into a single descriptor to reduce the matching complexity. Another approach is to also train two CNNs, but map RGB images and depth maps to a common space. In contrast to other approaches, the 3D pose of the object in the RGB image is explicitly estimated and used in the 3D model retrieval.

As noted above, methods and systems are described for performing 3D model retrieval using location fields and location field descriptors. The techniques described herein learn an embedding space that is optimized for 3D model retrieval, but first predict location fields from images (e.g., RGB images) and 3D models. 3D shape descriptors (e.g., pose-invariant 3D shape descriptors), referred to as location field descriptors, can then be computed from predicted and rendered location fields in an end-to-end trainable way. For example, a 3D model can be selected for an object in an image by matching a location field descriptor generated for the object with the location field descriptors generated for the 3D models to find the best matching 3D model. Given a single image showing one or more objects, the 3D model retrieval techniques described herein can retrieve a 3D model with accurate geometry for each object in an image.

Figure 3:
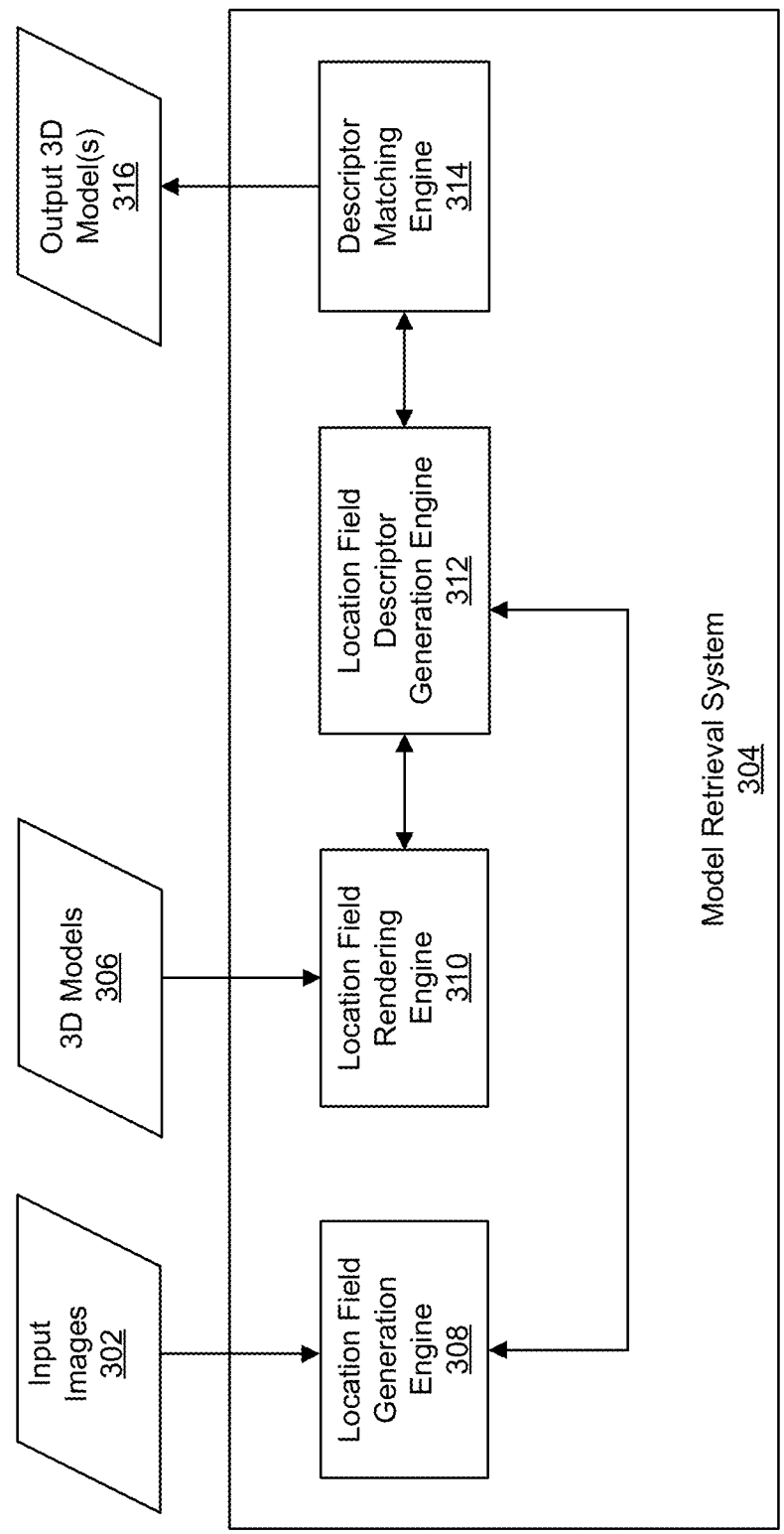
FIG. 3 is a block diagram illustrating an example of a model retrieval system, in accordance with some examples.

FIG. 3 is a block diagram illustrating an example of a model retrieval system 304. The model retrieval system 304 includes various components, including a location field generation engine 308, a location field rendering engine 310, a location field descriptor generation engine 312, and a descriptor matching engine 314. The components (e.g., the various engines) of the model retrieval system 304 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the model retrieval system 304 is shown to include certain components, one of ordinary skill will appreciate that the model retrieval system 304 can include more or fewer components than those shown in FIG. 3. For example, the model retrieval system 304 can also include an input device and an output device (not shown). The model retrieval system 304 may also include, in some instances, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices implemented in circuitry) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

The model retrieval system 304 can obtain the input images 302 from an image source (not shown). The model retrieval system 304 can process the obtained input images 302 to determine one or more output 3D models 316 for representing one or more objects detected in the input images 302. The input images 302 can include color images, such as red-green-blue (RGB) images, images having luma and chroma (or chroma-difference) color components (e.g., YCbCr, Y'CbCr, YUV, or the like), or images in any other suitable color format. RGB images will be used in various examples provided herein, however one of ordinary skill will appreciate that the techniques described herein can be performed using any type of image. The input images 302 can be one or more stand-alone images, or can be part of a sequence of images, such as a video, a burst of images, or other sequence of images. The image source can include an image capture device (e.g., a camera, a camera phone, a video camera, a tablet device with a built-in camera, or other suitable image capture device), an image storage device, an image archive containing stored images, an image server or content provider providing image data, a media feed interface receiving images or video from a server or content provider, a computer graphics system for generating computer graphics image data, a combination of such sources, and/or other source of image content.

In some examples, the model retrieval system 304 and the image source can be part of the same computing device. For example, the computing device can include an electronic device, such as a camera (e.g., a digital camera, a camera phone, a video phone, a tablet device with a built-in camera or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, a head-mounted display (HMD) or virtual reality headset, a heads-up display (HUD), a vehicle (e.g., an autonomous vehicle or a human-driven vehicle), or any other suitable electronic device. In some cases, the computing device (or devices) can include one or more wireless transceivers for wireless communications. In some examples, the model retrieval system 304 and the image source can be part of separate computing devices.

In contrast to previous methods that directly map 3D models and images to an embedding space, the model retrieval system 304 establishes a common low-level representation in the form of location fields for 3D models and for one or more objects detected in an image. The location field for an object in an image is predicted from the image. For example, the location field generation engine 308 can generate or predict a location filed for each object in an input image from the input images 302 (e.g., a first location field for a first object, a second location field for a second object, and so on). In some examples, the location field generation engine 308 can detect objects in an image, and can then compute a location field for each detected object.

In some cases, as described below, the location field generation engine 308 can include a convolutional neural network (CNN) (referred to as a location field CNN or LF-CNN) or other type of machine learning system that can be used to generate location fields for objects detected in an image. The LF-CNN can be trained to predict location fields for images of objects. In some cases, during a testing or inference stage of the LF-CNN, the LF-CNN can be used to detect objects in 2D in the image and compute a LF for each detected object. For example, LF-CNN can be a custom network that is trained to detect and localize one or multiple objects in an image (e.g., an RGB image) and to predict a LF for each detected object. In one illustrative example described in more detail below, the LF-CNN can be a Mask-RCNN with custom prediction branches.

The location fields for the 3D models 306 can be rendered directly from the 3D models 306. For example, the location field rendering engine 310 can render a location field rendering from each 3D model from the 3D models 306 (e.g., a first location field for a first model, a second location field for a second model, and so on). In one illustrative example described in more detail below, location fields can be generated directly from the 3D models 306 via custom shaders, such as using OpenGL and custom shaders.

A location field is an image-like representation that encodes a 3D surface coordinate in the canonical object coordinate system for each surface (or visible) pixel of an object, providing correspondences between 2D pixels and 3D surface coordinates. FIG. 4A is a diagram illustrating an example of a location field 420 generated for a chair object in an input image 402. Each pixel of the location field 420 includes an x-coordinate, a y-coordinate, and a z-coordinate relative to a center point of the object, indicating the 3D surface coordinate for that pixel. The three channels of the location field 420 are shown in FIG. 4A, which correspond to the x-, y-, and z-values of the 3D coordinates in separate images. For example, as shown in FIG. 4A, a horizontal x-component location field (LF(X)) includes the x-coordinate of each surface pixel of the chair, a vertical y-component location field (LF(Y)) includes the y-coordinate of each surface pixel of the chair, and a z-component location field (LF(Z)) in the depth direction includes the z-coordinate of each surface pixel of the chair. As shown in FIG. 4B and FIG. 4C (discussed below), a −z value corresponds to the front direction (coming out of the image), a +x value corresponds to the right direction, and a +y value corresponds to an up direction. The location field representation captures 3D shape and 3D pose information efficiently in an image-like structure, which is well suited for processing with machine learning systems, such as CNNs. Location fields implicitly handle occlusions and truncations and are invariant to texture and lighting. Because a location field encodes correspondences between 2D pixels and 3D surface coordinates, it explicitly captures 3D shape and 3D pose information without appearance variations that are irrelevant to the 3D model retrieval task.

FIG. 4B and FIG. 4C include a location field 430 rendered for a 3D model of a chair. For example, the 3D models 306 can be pre-processed (e.g., by the location field rendering engine 310 or by another component of the model retrieval system that is not shown in FIG. 3) by aligning the models in a consistent manner before generating the location fields for the 3D models 306. For example, the models can be scaled and/or translated to fit inside of a unit cube, and can be rotated to have a consistent front-facing direction in their canonical coordinate space. Referring to FIG. 4B, as shown in the LF(X) component of the location field 430, the chair model is scaled to fit inside a unit cube. A unit cube includes side lengths equal to one, and sits in the center of the coordinate system, as indicated by the (x,y,z) value of (0,0,0) in the LF(X) component of the location field 430. As shown in FIG. 4C, the chair model can also be rotated to a front facing direction in the canonical coordinate space. In some cases, a location field generated from an input image (e.g., predicted by the location field generation engine 308, which as described in more detail below can include a location field convolutional neural network (LF-CNN) can already have the consistent alignment described above, because the LF-CNN can be trained on location fields rendered from 3D models that were pre-processed using consistent alignment.

Regarding 3D model retrieval, location fields have several advantages compared to other rendered representations, such as RGB renderings, texture-less gray-scale renderings, silhouettes, depth renderings, normal renderings, or other renderings. For example, RGB renderings are subject to appearance variations, which are irrelevant for the task caused by material, texture, and lighting. Texture-less gray-scale renderings are affected by scene lighting. Silhouettes are not affected by such appearance variations, but discard valuable 3D shape information. Depth and normal renderings capture 3D geometry but lose the relation to the 3D pose in the object's canonical coordinate system. In contrast, location fields explicitly present 3D shape and 3D pose information, as they establish correspondences between 2D object pixels and 3D coordinates on the object surface. With respect to the 3D shape, the dense 3D coordinates provide a partial reconstruction of the object geometry. With respect to the 3D pose, the object rotation and translation can be geometrically recovered (if needed) from the 2D-3D correspondences using a PnP algorithm.

The location field descriptor generation engine 312 can compute location field descriptors from the location fields of the 3D models 306 and from the location fields of the objects from the input images 302. A location field descriptor is a 3D shape descriptor that includes information defining the shape of the object (e.g., an object detected in an image or an object represented by a 3D model). A location field descriptor can be in the form of an M-dimensional vector, where M is an integer greater than 1. In some cases, instead of exhaustively comparing location fields from different viewpoints, pose-invariant 3D location field descriptors (referred to herein as pose-invariant center descriptors, or center descriptors) can be computed from the location fields in an embedding space optimized for retrieval from the location fields. In some cases, a database of location field descriptors can be built for the 3D models 306. In some implementations, the location field descriptors can be generated for the 3D models 306 offline before 3D model retrieval is performed for the input images 302 (before the input images 302 are analyzed for selecting 3D models for objects in the input images), in which case the database of location field descriptors can be built and then used to perform 3D model retrieval for input images.

Figure 5A:
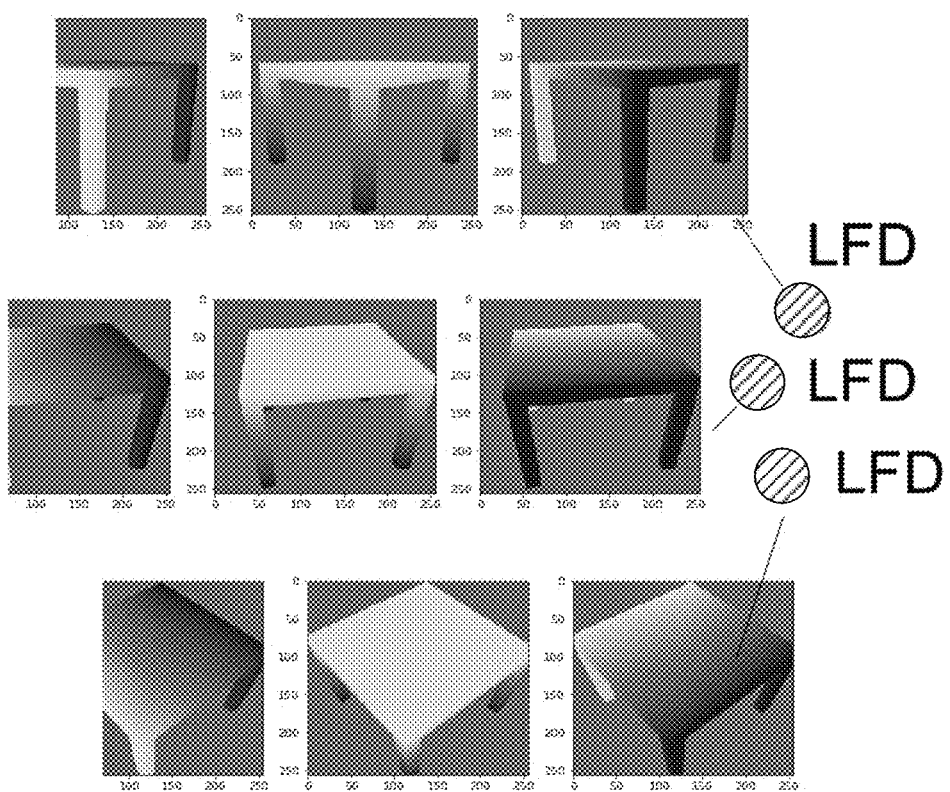
FIG. 5A and FIG. 5B are diagrams illustrating examples of location field descriptors generated from location fields of different objects, in accordance with some examples.
Figure 5B:
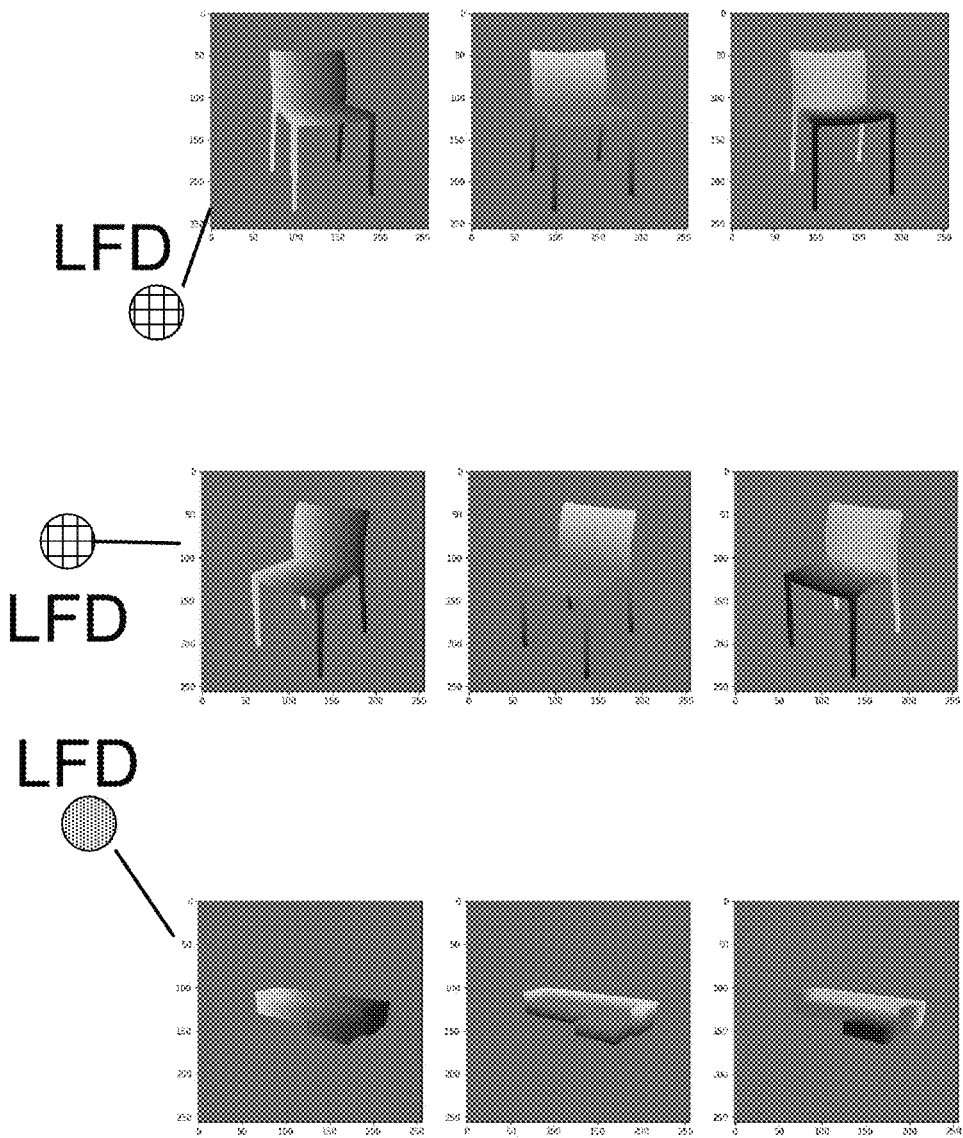

In some cases, the location field descriptor generation engine 312 can include a CNN (referred to as a location field descriptor CNN or LFD-CNN) or other type of machine learning system that can be used to compute the location field descriptors. The LFD-CNN can be a custom network that maps location fields to a descriptor space that is optimized for 3D model retrieval. The LFD-CNN can be trained to predict location field descriptors from both location fields predicted from images and location fields rendered from 3D models. During training, a pose-invariant center descriptor can be learned for each 3D model. In one illustrative example described in more detail below, the LFD-CNN can include a DenseNet-like CNN and can optimize a Triplet-Center-Loss. During the training, the LFD-CNN can be optimized so that the distances (e.g., Euclidean distance, Cosine distance, or other suitable distance) between location field descriptors of location fields showing the same 3D model under different poses are small, but the distances between location field descriptors of location fields showing different 3D models are large. For example, referring to FIG. 5A and FIG. 5B, the dots with the different patterns represent different location field descriptors generated using the location field descriptor generation engine 312. The location field descriptors shown with a dot having the same pattern are associated with locations fields showing the same 3D model. During a testing or inference stage of the LFD-CNN when analyzing input images, the LFD-CNN can compute a location field descriptor for each location field generated for an object in an image (and in some cases location fields for the models 306).

The descriptor matching engine 314 can compare the location field descriptor generated for an object detected in an input image to the location field descriptors (e.g., stored in the database of location field descriptors) generated for the 3D models 306. When a pose-invariant center descriptor is generated for each location field, only a single center descriptor needs to be evaluated during inference for each 3D model in the database, allowing the 3D model retrieval fast and scalable. The 3D model having the location field descriptor that is closest (e.g., based on a distance, such as Euclidean distance or Cosine distance) to the location field descriptor of the object can be selected as an output 3D model 316 for representing the object. In some cases, a ranked list of 3D models for the object can be generated, and a 3D model can be selected from the list (e.g., a top ranked 3D model). The ranked list of 3D models can include the best matching 3D model having a highest rank, a second-best matching 3D model having a second-to-highest rank, and so on.

The 3D model selected for representing an object in an image can be provided for use by any suitable application that can utilize a 3D model (e.g., 3D mesh) for performing one or more operations. In one illustrative example, an output image (e.g., image 103 shown in FIG. 3) can be generated that includes the selected 3D model 316 rendered with the input image. For example, the selected 3D model can be used by an augmented reality (AR), virtual reality (VR), and/or mixed reality (MR) application to represent the object in an AR, VR, and/or MR environment. In one example, referring to FIG. 6, the top-ranked 3D chair model from the ranked 3D models 616 can be selected to represent the chair object in the input image 602. The 3D chair model can replace the chair object in an output image. A viewer can then manipulate the location, orientation, geometry, and/or other characteristic of the 3D chair model.

In other examples, the 3D mesh of the 3D model 316 can be used for 3D scene understanding, object grasping (e.g., in robotics, surgical applications, and/or other suitable applications), object tracking, scene navigation, and/or other suitable applications. For example, based on a 2D input image of the scene, a 3D scene modeling application can determine the 3D layout of the scene using the 3D meshes of matched 3D models representing objects in the scene. As another example, an algorithm controlling a robot can determine the geometry and pose of a real-world object that the robot is attempting to grasp based on an input 3D mesh representing the real-world object. The algorithm can then cause the robot to grasp the real-world object based on the estimated geometry and pose defined by the 3D mesh of the matched 3D model.

The early fusion of 3D models and images results in several advantages. For example, the intermediate location field predictions serve as a regularizing bottleneck, which reduces the risk of overfitting in the case of limited training data compared to directly mapping to an embedding space. Further, major parts of the system benefit from training on a virtually infinite amount of synthetic data (i.e., by using rendered location fields from models) due to the early fusion of 3D models and RGB images. Even further, the predicted location fields are visually interpretable and offer valuable insights in cases where the approach fails, effectively unblackboxing the system.

In some examples, the 3D models can be associated with semantic information. For instance, a 3D model can be provided with data (e.g., metadata) that defines semantic properties of the 3D model. Examples of semantic properties include appearance of the 3D model (e.g., texture such as smooth or rough, color, sheen, reflectance, among others), physical movement of the 3D model (e.g., a range of possible movement of the 3D model, an amount the 3D model can be stretched and/or compressed, among others), actions that can be performed the 3D model (e.g., a 3D model of a glass window that can be broken or shattered, a 3D model of an airplane with a propeller that rotates when it is flown, among others), any combination thereof, and/or other semantic properties.

The semantic properties defined by the data can allow a user to interact with the 3D model through a user interface. For instance, a user can interact with a 3D model according to the semantic properties defined for a 3D model. In one illustrative example using a 3D model of a car, a user can open a door of the car based on semantic properties defining how the car door can open and close. In another illustrative example using a 3D model of a window, a user can break the window according to the semantic properties of the 3D model of the window. In another illustrative example using a 3D model of a log cabin, a user can build and/or disassemble the log cabin based on the semantic properties defined for the 3D model of the log cabin.

Figure 6:
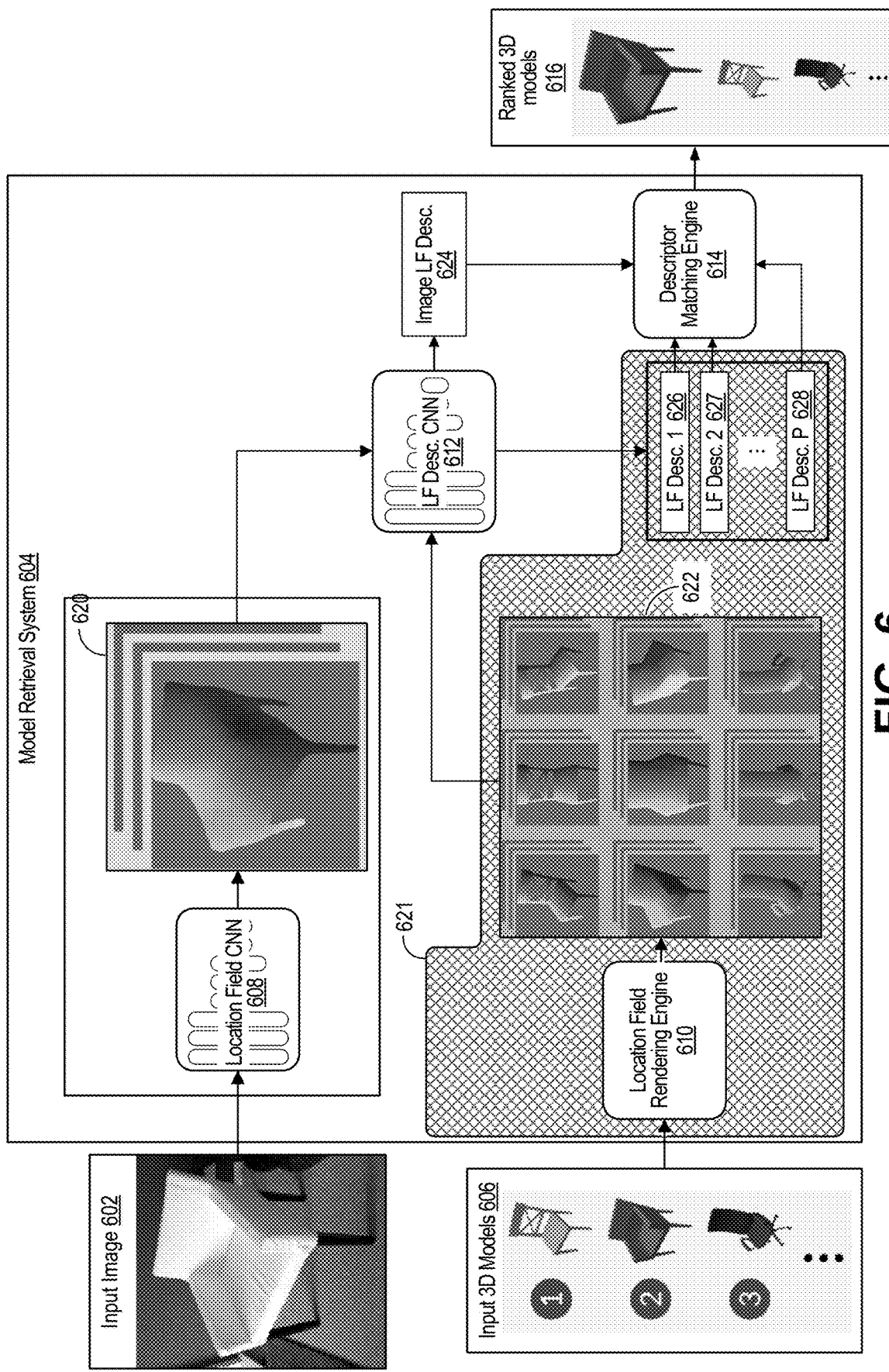
FIG. 6 is a block diagram illustrating an example implementation of the model retrieval system, in accordance with some examples.

FIG. 6 is a block diagram illustrating an example implementation of a model retrieval system 604, including a location field CNN (LF-CNN) 608 as an example implementation of the location field generation engine 308, a location field rendering engine 610, a location field descriptor CNN (LFD-CNN) 612 as an example implementation of the location field descriptor generation engine 312, and a descriptor matching engine 614. Provided in FIG. 6 are visual representations of an input image 602 with a chair object, input 3D models 606, location fields 620 generated for the chair object detected in the input image 602, location fields 622 rendered from the input 3D models 606, and a ranked list of 3D models 616 for the chair object.

As described in more detail below, given a single RGB (e.g., the input image 602) and a 3D model database (e.g., including input 3D models 606), the model retrieval system 604 can retrieve a 3D model for each object in the image. For example, the LF-CNN 608 can generate a location field 620 for the chair object in input image 602. The location field rendering engine 610 can generate location fields from the input 3D models 606. The LFD-CNN 612 can compute location field descriptors (e.g., pose-invariant 3D shape descriptors) from the locations fields. The descriptor matching engine 614 can match the descriptors to find the best 3D model for the chair object.

The components (e.g., the various engines) of the model retrieval system 604 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Similar to the model retrieval system 304 from FIG. 3, while the model retrieval system 604 is shown to include certain components, one of ordinary skill will appreciate that the model retrieval system 604 can include more or fewer components than those shown in FIG. 6. For example, the model retrieval system 304 can also include an input device and an output device (not shown), one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices implemented in circuitry) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 6.

As noted above, the model retrieval system 604 can map the input 3D models 606 and the RGB image 602 to a common low-level representation in the form of location fields. As previously discussed, a location field is an image-like representation that encodes a 3D surface coordinate for each object pixel. Compared to its reference RGB image (with the three channels encoding red (R), green (G), and blue (B) colors), a location field can have the same size and spatial resolution, but the three channels encode x-, y-, and z- 3D coordinates in the canonical object coordinate system instead of RGB colors (as shown in FIG. 4A, FIG. 4B, and FIG. 4C). Locations fields explicitly present 3D shape and 3D pose information, because they encode dense correspondences between 2D pixel locations and 3D surface coordinates. In some cases, from these 2D-3D correspondences, the 3D pose of an object in an image can be geometrically recovered using a perspective-n-point (PnP) algorithm. For instance, a PnP algorithm can recover rotation and translation from 2D-3D correspondences. Any suitable PnP technique can be used, including P3P, efficient PnP (EPnP), or other suitable PnP technique. One example of a PnP algorithm that can be used is described in Lepetit, V; Moreno-Noguer, M; Fua, P. (2009). "*EPnP: An Accurate O(n) Solution to the PnP Problem*". *International Journal of Computer Vision*. 81 (2): 155-166, which is hereby incorporated by reference in its entirety and for all purposes. It is noted that the pose of the object is not needed to retrieve the 3D models from images using the techniques described herein, and thus the pose does not have to be determined. However, the pose can be determined in some cases (e.g., using PnP) for use in applications that can use the 3D model, such as for example, to determine how to orient the 3D model when provided in an output image, in a robotics application to determine how to grasp a particular object, for scene layout positioning, among others.

Location fields can also be interpreted as structured partial 3D point clouds. Due to the image-like structure, this representation is well-suited for regression with a CNN. The location field rendering engine 610 can render the location fields 622 directly from the 3D models 606. To render the location fields 622 from the 3D models 606, the location field rendering engine 610 can rasterize 3D meshes (e.g., using OpenGL) and can implement a custom fragment shader that linearly interpolates per-vertex 3D coordinates along the triangles of a 3D mesh. For instance, the location field rendering engine 610 can rasterize (e.g., using OpenGL) a 3D mesh of a 3D model to determine a 3D surface coordinate for each vertex of the 3D mesh, and can interpolate 3D surface coordinates for points between the vertices of the 3D mesh of the 3D model. The coordinates for the points between the vertices of the 3D mesh can be interpolated because a dense sampling of 3D points may be needed for a location field. A 3D mesh includes a plurality of triangles, and each of the triangles has three vertices. Determining 3D coordinates for only the vertices may not provide enough data for a location field because there would be gaps or holes in the location field model. Performing the interpolation between the vertices of each triangle using the fragment shader can provide the dense sampling of 3D points. Because the interpolated values describe 3D coordinates in the canonical object coordinate system, the relation to the inherent object orientation is preserved.

The location fields 622 generated from the input 3D models 606 include location fields of the models in different poses, as shown in FIG. 6. For example, as shown in the top row of the location fields 622, three different location fields are generated for the chair in three different poses (one pose with the chair oriented toward the left of the image, one pose with the chair facing forward, and one pose with the chair oriented toward the right of the image). While the location fields 622 are shown to include nine location fields, one of ordinary skill will appreciate that any number of location fields can be generated, based on the number of 3D models and based on the number of desired poses for the 3D models.

In order to generate location fields from RGB images, the LF-CNN 608 can detect objects in two dimensions and can predict a location field for each object. In some cases, the LF-CNN 608 can be a Faster/Mask R-CNN framework with additional extended features. This multi-task framework of the LF-CNN 608 can include a 2D object detection pipeline to perform per-image and per-object computations. The LF-CNN 608 can address multiple different tasks using a single end-to-end trainable network.

In the context of the generalized Faster/Mask R-CNN framework of the LF-CNN 608, each output branch can provide a task-specific subnetwork with different structures and functionality, including a mask branch that can performs region-based per-object computations. For example, the mask branch can generate a segmentation mask for an image indicating which pixels of the image correspond to a particular object and which pixels do not belong to the object. The LF-CNN 608 can also include a dedicated output branch for estimating location fields alongside the existing object detection branches. Similar to the mask branch, the location field branch can perform region-based per-object computations. For example, for each detected object, an associated spatial region of interest in the feature maps can be aligned to a fixed size feature representation with a low spatial but high channel resolution using linear interpolation (e.g., 14×14×256). These aligned features can serve as a shared input to the classification, mask, and location field branches. Each branch can be evaluated N times per image, where N is the number of detected objects.

The location field branch of the LF-CNN 608 can use a fully convolutional sub-network to predict a tensor of 3D points at a resolution of 56×56×3 from the shared aligned features. The mask branch can be modified to predict 2D masks at the same spatial resolution. The predicted 2D masks can be used to threshold the tensor of 3D points to get low-resolution location fields. This approach can generate significantly higher accuracy location fields compared to directly regressing low-resolution location fields, which can predict over-smoothed 3D coordinates around the object silhouette. During training, the predicted location fields can be optimized using the Huber loss.

The resulting low-resolution location fields can be up-scaled and padded to obtain high-resolution location fields with the same spatial resolution as the input image. In some cases, if the model retrieval is unsuccessful for a given image or a given object in an image, generating location fields with the same spatial resolution as the input image can be helpful. For example, a visual overlay of the input image and the predicted location fields is intuitively interpretable and can offer valuable insights to why the model retrieval failed.

The LFD-CNN 612 can compute location field descriptors from the location field 620 of the chair object in the input image 602, and from the location fields 622 of the 3D models 606. In some cases, the LFD-CNN 612 can compute descriptors from the low-resolution location fields, because upscaling does not provide additional information but increases the computational workload. Moreover, the predicted low-resolution location fields are tightly localized crops, which reduces the complexity of the descriptor computation.

In some cases, as noted above, the LFD-CNN 612 can compute pose-invariant center descriptors. For example, instead of exhaustively comparing each predicted location field to multiple rendered location fields from different viewpoints, the LFD-CNN 612 can map location fields to pose-invariant 3D shape descriptors in an embedding space. For this purpose, the LFD-CNN 612 can utilize a dense connection pattern (e.g., a DenseNet). Similar to ResNets, DenseNets introduce skip-connections in the computational graph, but concatenate feature maps instead of adding them. The dense connection pattern encourages feature reuse throughout the neural network and leads to compact but expressive models. This architecture is well-suited for computing descriptors from location fields, because they already provide a high level of abstraction. Location fields are not effected by task-irrelevant appearance variations caused by color, material, texture or lighting. The object is already segmented from the background and occlusions in the predicted location fields are resolved by the 2D mask used for thresholding the tensor of 3D points. The raw 3D coordinates provide useful matching attributes, for example by aligning query and test point clouds using an iterative closest point (ICP) algorithm. Thus, extensive feature reuse within the LFD-CNN 612 is rational.

In order to learn an embedding space which is optimized for 3D model retrieval, at least two requirements are addressed. First, the embedding space should be discriminative in terms of 3D models, and secondly, the computed descriptors should be invariant to the 3D pose of the object in the location field. Both requirements can be jointly addressed by learning a representative center descriptor for each 3D model, including the location field descriptor 1 626, the location field descriptor 2 627, through location field descriptor P 628 shown in FIG. 6, where P is the number of 3D models in the input 3D models 606. To generate the center descriptors, the LFD-CNN 612 can be trained to map location fields of a 3D model from different viewpoints close to its corresponding center descriptor. At the same time, it is ensured that all center descriptors are discriminatively distributed in the embedding space. Thus, during training, the distances between location field descriptors and center descriptors are penalized in a way that each location field descriptor and its corresponding center descriptor are pulled closer together, while all center descriptors are pulled further apart. This approach is analogous to a nonlinear discriminant analysis, in which the intra-class variance is minimized, while the inter-class variance is maximized to train more discriminative embeddings.

The ideas of Center loss and Triplet-Center loss are built upon to optimize the embedding space. The Center loss is as follows:

$$L_C = \sum_{i=1}^{N} D(f_i, c_{y_i}),$$

and minimizes the distance $D(f_i, c_{y_i})$ between a location field descriptor $f_i$ and its corresponding center descriptor $c_j$. In this case, $y_i$ is the index of the corresponding 3D model and N denotes the number of samples. For the distance function $D(\bullet)$, the Huber distance can be used in one illustrative example. In contrast, the Triplet-Center loss:

$$L_{TC} = \sum_{i=1}^{N} \max\left(0, D(f_i, c_{y_i}) + m - \min_{j \neq y_i} D(f_i, c_j)\right)$$

enforces the same distance $D(f_i, c_{y_i})$ to be smaller than the distance between a location field descriptor and its closest non-corresponding center descriptor $_{j \neq y_i}{}^{min} = D(f_i, c_j)$ by at least the margin m.

As a consequence, in some cases the Center loss minimizes intra-class variance, while the Triplet-Center loss aims at both minimizing intra-class variance and maximizing inter-class variance. In some cases, however, the Triplet-Center loss can fail to achieve these goals, and may learn degenerated clusterings because the optimization criterion does not guarantee the desired properties. Thus, in some cases, a combination of Center loss and Triplet-Center loss can be used in the Descriptor loss, as follows:

$$L_D = L_{softmax} \alpha L_C + \beta L_{TC},$$

to achieve both low intra-class variance and high inter-class variance. In some examples, these losses are combined with a softmax loss $L_{softmax}$ to learn more discriminative embeddings than classification alone. The parameters α and β control the impact of the different loss terms. The parameters α and β can be Lagrange multipliers or other multipliers. For example, the parameters α and β can include different weights that can be applied to the individual loss terms, which is helpful because the individual loss terms can have different numeric ranges and importances.

The center descriptors are not fixed, but are learned during training. For example, the center descriptors can be trainable weights of the LFD-CNN 612 in some implementations. In some cases, even though the system optimizes a triplet criterion, it does not require location field triplets as training input. In some cases, only a single location field and its corresponding 3D model index $y_i$ are needed. The center descriptors required for the Triplet loss can be sampled within the LFD-CNN 612. In some cases, hard triplet mining can be less important, because the closest non-corresponding center descriptor are always sampled and also because Center and softmax losses are employed.

The LFD-CNN 612 can be jointly trained on predicted location fields (predicted from images) and rendered location fields (rendered from 3D models). This is a major advantage compared to other approaches that directly map to an embedding space, because training data in the form of RGB images with 3D model annotations is limited. In contrast, LFD-CNN 612 benefits from training on a virtually infinite amount of synthetic data (including the rendered location fields). The intermediate location field prediction also serves as a regularizing bottleneck and reduces the risk of overfitting, because regressing location fields is more difficult than computing embeddings.

Because there is a domain gap between predicted and rendered location fields, Feature Mapping can be performed, as described in M. Rad, M. Oberweger, and V. Lepetit, "Feature Mapping for Learning Fast and Accurate 3D Pose Inference from Synthetic Images," In Conference on Computer Vision and Pattern Recognition, pages 4663-4672, 2018, which is hereby incorporated by reference in its entirety and for all purposes. A residual block can be used to map location field descriptors from the predicted to the rendered domain. Thus, the training input can include pairs of corresponding predicted and rendered location fields or single location fields, and can include a 3D model index $y_i$ in both cases. In the case of pairs of corresponding predicted and rendered location fields, an additional Feature Mapping loss can be computed between corresponding feature-mapped predicted and rendered location field descriptor using the Huber distance.

To perform retrieval from a previously unseen 3D model database, the center descriptors can be generated without retraining. For each unseen 3D model, the location field rendering engine 610 can render a certain number of location fields (e.g., 100 location fields) under different 3D poses, the LFD-CNN 612 can compute the center descriptor embeddings and can average the center descriptors to obtain a new center descriptor. In some examples, as an alternative, the LFD-CNN 612 can be retrained by incorporating the new 3D models as additional rendered location fields. As illustrated by the section 621 in FIG. 6 with a hatched pattern, the center descriptors (e.g., the location field descriptor 1 626, the location field descriptor 2 627, through location field descriptor P 628) can be computed offline, which results in fast inference by the LFD-CNN 612.

In cases when the center descriptors are computed offline, during inference the model retrieval system 604 only needs to process input images using the LF-CNN 608 and process the resulting location fields using the LFD-CNN 612 since the center descriptors have already been computed offline. For instance, for each RGB image, the LF-CNN 608 is evaluated once and the LFD-CNN 612 is evaluated N times to compute location field descriptors, where N is the number of detected objects. As described above with respect to FIG. 3, the descriptor matching engine 614 can then match each computed location field descriptor (including the image location field descriptor 624 generated for the location field 620 of the object in the input image 602) against all center descriptors of the 3D models 606. For example, the descriptor matching engine 614 can determine a first distance (e.g., Euclidean distance, Cosine distance, or other suitable distance) between the location field descriptor 624 and the center location field descriptor 1 626, a second distance between the location field descriptor 624 and the center location field descriptor 2 628, through a Pth distance between the location field descriptor 624 and the center location field descriptor P 628. The descriptor matching engine 614 can then generate a ranked list of 3D models 616 based on the distance between the descriptors. In some cases, the descriptor matching engine 614 can output the top matching 3D model having the center location field descriptor with the shortest distance to the location field descriptor 624 of the chair object in the image 602.

The LF-CNN 608 and the LFD-CNN 612 are end-to-end trainable. The system loss is a combination of our the Location Field loss, the Descriptor loss, and the Feature Mapping loss, and the Detection losses of the generalized Faster/Mask R-CNN framework described above.

Examples of implementation and training details will now be discussed. For the LF-CNN 608, a Feature Pyramid Network can be used on top of a ResNet-101 backbone. For the LFD-CNN 612, a DenseNet-50 architecture can be used with 3 dense blocks and a growth rate of 24. For the implementation, RGB images (or other images) can be resized and padded to a spatial resolution of 512×512×3, maintaining the aspect ratio. For the location fields, a resolution of 58×58×3 can be used. In this configuration, the LFD-CNN 612 maps low-resolution location fields to a 270-dimensional embedding space.

The convolutional backbone and the detection branches of the Location Field CNN can be initialized with weights trained for instance segmentation on the COCO dataset. The location field branch and the LFD-CNN 612 can be trained from scratch. The LF-CNN 608 and the LFD-CNN 612 networks can be trained for 300 epochs using a batch size of 32. The initial learning rate of $1e^{-3}$ can be decreased by a factor of 5 after 150 and 250 epochs.

Different forms of data augmentation can be employed. For RGB images, data augmentation techniques such as mirroring, jittering of location, scale, and rotation, and independent pixel augmentations (like additive noise) can be used. For rendered location fields (rendered from the 3D models), different forms of blurring can be additionally used to simulate predicted location fields. During training of the LFD-CNN 612, synthetic data can be leveraged. The LFD-CNN 612 can be trained on predicted and rendered location fields using a ratio of 1:3.

To balance the individual terms in the system loss:

$$L = L_D + L_{softmax} + \alpha L_C + \beta L_{TC} + \gamma L_{LF} + \delta L_{FM},$$

unit weights can be assigned to classification losses and non-unit weights can be assigned to regression losses. Thus, the unmodified Detection losses ($L_D$) of the generalized Faster/Mask R-CNN framework and the Descriptor CNN softmax loss ($L_{softmax}$) can be combined with the weighted Center loss ($L_C$), the Triplet-Center loss ($L_{TC}$), the Location Field ($L_{LF}$) loss, and the Feature Mapping ($L_{FM}$) loss. Experimentally, the parameters can be set as $\alpha=0.01$, $\beta=0.1$, $\gamma=10$, $\delta=0.01$, and a margin of $m=1$ can be used. For the Huber distance, the threshold can be set to 1.

To demonstrate the benefits of the above-described model retrieval systems and techniques, the model retrieval system 604 is evaluated on various challenging real-world datasets with different object categories, including: Pix3D (bed, chair, sofa, table), Comp (car), and Stanford (car). In addition to retrieval from 3D models provided by these datasets, 3D models were also retrieved from ShapeNet.

Table 1 below presents an overview of the object categories, the number of RGB images, and the number of 3D models in the evaluated datasets.

| Dataset | Category | Train Images | Test Images | 3D Models from Dataset | 3D Models from ShapeNet |
| --- | --- | --- | --- | --- | --- |
| Pix3D | bed | 203 | 191 | 19 | 254 |
|  | chair | 1506 | 1388 | 221 | 6778 |
|  | sofa | 552 | 540 | 20 | 3173 |
|  | table | 387 | 351 | 62 | 8443 |
| Comp | car | 3798 | 1898 | 98 | 7497 |
| Stanford | car | 8144 | 8041 | 134 | 7497 |

As shown in Table 1, the Pix3D, Comp, and Stanford datasets provide a large number of RGB images and a moderate number of 3D models with corresponding annotations. In contrast, ShapeNet does not provide RGB images, but does provide a large number of 3D models.

The Pix3D dataset provides multiple categories. However, for experimentation purposes, training and evaluation can be performed only on categories that have more than 300 non-occluded and non-truncated samples (e.g., bed, chair, sofa, and table). Further, for experimentation, the training and evaluation can be restricted to samples marked as non-occluded and non-truncated, because it is not known which object parts are occluded nor the extent of the occlusion, and many objects are heavily truncated. For each 3D model, 50% of the corresponding images can be randomly chosen for training, and the other 50% can be randomly chosen for testing.

The Comp and Stanford datasets only provide one category (a car). Most of the images show one prominent car which is non-occluded and non-truncated. The two datasets already provide a train-test split. Thus, the experimentation uses all available samples from Comp and Stanford for training and evaluation.

In contrast to these datasets which provide a large number of RGB images and a moderate number of 3D models with corresponding annotations, ShapeNet does not provide RGB images, but provides a large number of 3D models as noted above. Due to its enormous size, ShapeNet not only covers many different object categories, but also presents a large variety in 3D model geometry. If 3D models are present in the respective dataset and in ShapeNet, the 3D models are excluded for retrieval from ShapeNet to evaluate retrieval from an entirely unseen database.

All 3D models are consistently oriented, scaled, and translated for the experiments. For example, all 3D models are rotated to have common front facing, up, and starboard directions. Additionally, the 3D models are scaled and translated to fit inside a unit cube centered at the coordinate origin (0, 0, 0), while preserving the aspect-ratio of the 3D dimensions. This 3D model alignment is not only important for training the LFD-CNN, but also for the evaluated metrics. For example, computing the modified Hausdorff distance and the 3D intersection-over-union (IOU) between two 3D models is only meaningful if they are consistently oriented, scaled, and centered.

Quantitative as well as qualitative results are provided below, which significantly outperform the state-of-the-art techniques. In particular, quantitative results for 3D model retrieval are provided from seen and unseen databases in comparison to the state-of-the-art. Qualitative results of the approach are also provided, along with results from an ablation study. For the quantitative evaluation, the following well-established metrics are used:

Detection: the detection accuracy $Acc_{D_{0.5}}$ is reported, which gives the percentage of objects for which the intersection over union between the ground truth 2D bounding box and the predicted 2D bounding box is larger than 50%. This metric is an upper bound for other Acc metrics since blind predictions are not made.

Retrieval Accuracy: the retrieval accuracies $Acc_{Top-1}$ and $Acc_{Top-10}$ are evaluated, which give the percentage of objects for which the ground truth 3D model equals the top ranked 3D model (Top-1), or is in the top ten ranked 3D models (Top-10). These metrics can only be provided if the ground truth 3D model is in the retrieval database.

TABLE 2

| Method | Dataset | Category | $Acc_{D_{0.5}}$ | $Acc_{Top-1}$ | $Acc_{Top-10}$ | $d_{HAU}$ | $d_{IOU}$ | Unseen 3D models dHAU | $d_{IOU}$ |
|---|---|---|---|---|---|---|---|---|---|
| Meth. 1 | Pix3D | bed | 99.0% | 19.4% | 46.6% | 0.0821 | 0.3397 | 0.0960 | 0.2487 |
| Meth. 2 | | | | 35.1% | 83.2% | 0.0385 | 0.5598 | 0.0577 | 0.3013 |
| Current Method | | | | 64.4% | 89.0% | 0.0152 | 0.8074 | 0.0448 | 0.3490 |
| Meth. 1 | Pix3D | chair | 91.5% | 17.3% | 49.1% | 0.0559 | 0.3027 | 0.0843 | 0.1334 |
| Meth. 2 | | | | 41.3% | 73.9% | 0.0305 | 0.5469 | 0.0502 | 0.1965 |
| Current Method | | | | 58.1% | 81.8% | 0.0170 | 0.7169 | 0.0375 | 0.2843 |
| Meth. 1 | Pix3D | sofa | 96.9% | 21.7% | 52.2% | 0.0503 | 0.3824 | 0.0590 | 0.3493 |
| Meth. 2 | | | | 44.1% | 89.8% | 0.0197 | 0.7762 | 0.0294 | 0.6178 |
| Current Method | | | | 67.0% | 94.4% | 0.0075 | 0.9028 | 0.0178 | 0.7472 |
| Meth. 1 | Pix3D | table | 91.2% | 12.0% | 34.2% | 0.1003 | 0.1715 | 0.1239 | 0.1047 |
| Meth. 2 | | | | 33.9% | 66.1% | 0.0607 | 0.4500 | 0.0753 | 0.1730 |
| Current Method | | | | 53.3% | 80.1% | 0.0288 | 0.6383 | 0.0482 | 0.2573 |
| Meth. 1 | Pix3D | mean | 94.6% | 17.6% | 45.5% | 0.0722 | 0.2991 | 0.0908 | 0.2090 |
| Meth. 2 | | | | 38.6% | 78.3% | 0.0374 | 0.5832 | 0.0531 | 0.3222 |
| Current Method | | | | 60.7% | 86.3% | 0.0171 | 0.7663 | 0.0370 | 0.4095 |
| Meth. 1 | Comp | car | 99.9% | 2.4% | 18.2% | 0.0207 | 0.7224 | 0.0271 | 0.6344 |
| Meth. 2 | | | | 10.2% | 36.9% | 0.0158 | 0.7805 | 0.0194 | 0.7230 |
| Current Method | | | | 20.5% | 58.0% | 0.0133 | 0.8142 | 0.0165 | 0.7707 |
| Meth. 1 | Stanford | car | 99.6% | 3.7% | 20.1% | 0.0198 | 0.7169 | 0.0242 | 0.6526 |
| Meth. 2 | | | | 11.3% | 42.2% | 0.0153 | 0.7721 | 0.0183 | 0.7201 |
| Current Method | | | | 29.5% | 69.4% | 0.0110 | 0.8352 | 0.0150 | 0.7744 |

In Table 2 above, experimental results on the Pix3D, Comp, and Stanford datasets are shown. Results for 3D model retrieval are provided from both seen (in training dataset) and unseen (ShapeNet) 3D model databases given unseen test images. As shown, the techniques described herein outperform the state-of-the-art in all metrics and datasets. A detailed discussion of the reported numbers is provided further below. Method 1 ("Meth. 1" in the table) refers to a technique described in M. Aubry and B. Russell., "Understanding Deep Features with Computer-Generated Imagery," In *Conference on Computer Vision and Pattern Recognition*, pages 2875-2883, 2015. Method 2 ("Meth. 2" in the table) refers to a technique described in A. Grabner, P. M. Roth, and V. Lepetit, "3D Pose Estimation and 3D Model Retrieval for Objects in the Wild," In *Conference on Computer Vision and Pattern Recognition*, pages 3022-3031, 2018. The "Current Method" in Table 2 refers to the techniques described herein using location fields and location field descriptors.

Hausdorff Distance: a modified Hausdorff distance is computed, as follows:

$$d_H = \frac{1}{|\mathcal{X}| + |\mathcal{Y}|}\left(\sum_{x \in \mathcal{X}} \min_{y \in \mathcal{Y}} D(x, y) + \sum_{y \in \mathcal{Y}} \min_{x \in \mathcal{X}} D(y, x)\right),$$

between the ground truth 3D model x and the retrieved 3D model y. For each vertex x∈X and y∈Y, the Euclidean distance D(•) is calculated to the closest vertex from the other 3D model, and the mean is computed over both sets. Before computing $d_H$, each 3D model is regularly resampled. The mean modified Hausdorff distance is reported for all detected objects ($d_{HAU}$). Since all 3D models are consistently aligned, the score is in the interval $[0, \sqrt{2}]$ (where lower is better).

3D Intersection Over Union: the 3D intersection over union is computed between a voxelization of the ground truth 3D model and a voxelization of the retrieved 3D model. For this purpose, 3D models are voxelized using binvox with a resolution of 128×128×128. The mean 3D IOU for all detected objects ($d_{IOU}$) is reported. The score is in the interval [0, 1] (where higher is better).

To present results for 3D model retrieval on Pix3D, Comp, and Stanford, the techniques described herein are compared to a baseline method (Method 1 from Table 2—"Understanding Deep Features with Computer-Generated Imagery") and a state-of-the-art method (Method 2 from Table 2—"3D Pose Estimation and 3D Model Retrieval for Objects in the Wild"). Since Method 1 and Method 2 assume that objects are already detected in 2D, the detections given by the LF-CNN are used for a fair comparison. The results are summarized in Table 2 above, where it is shown that the techniques described herein significantly outperform the state-of-the-art in all metrics and datasets.

For instance, the techniques described herein correctly detect 95% of all objects in the images on average $Acc_{D_{0.5}}$, since object detection is tightly integrated into the model retrieval system 604. In some cases, the LF-CNN 608 can be initialized with weights trained for instance segmentation on the COCO dataset and all evaluated categories are present in COCO.

Two different retrieval setups are also evaluated. First, all 3D models from the respective dataset are used as a 3D model database for retrieval (referred to as "seen 3D models"). In this case, the correct 3D model ($Acc_{Top-1}$) was retrieved for more than 60% of all test samples on average on Pix3D. This is a significant improvement of more than 20% absolute compared to the state-of-the-art. Also, the retrieval accuracy quickly raises if the top ten ranked 3D models ($Acc_{Top-10}$) is considered.

In contrast, the retrieval accuracy on Comp and Stanford is significantly lower for all evaluated methods. This is due to the significantly smaller variation in the overall shape of cars compared to chairs, for example. Thus, many 3D models of cars have a similar appearance in multiple 3D poses and can only be discriminated by extremely fine-grained details like wheel rims or radiator grill structure. Such pixel-level information is usually discarded by CNNs.

However, by analyzing the mesh similarity between the ground truth 3D model and the top retrieved 3D model ($d_{HAU}$ and $d_{IOU}$), consistent high performance is observed across all datasets and categories. To put the reported numbers in perspective, the mean of the modified Hausdorff distance (0.1236) and the 3D IOU (0.0772) is computed for all pairs of 3D models in the training datasets. These numbers represent the accuracy for picking a random 3D model. For both metrics, the mesh similarity of the 3D model retrieved using the techniques described herein is approximately 10 times better compared to picking a random 3D model. Additionally, the techniques described herein significantly outperform the state-of-the-art by up to 50% relative considering $d_{HAU}$.

In the second retrieval setup, retrieval is performed from previously unseen 3D models from ShapeNet (referred to as "unseen 3D models"). Since the correct 3D model is not in the database in this case, the achievable performance is limited. Thus, the reported numbers are slightly worse compared to retrieval from previously seen 3D models. Still, the performance is much better compared to picking a random 3D model. In fact, for some categories (e.g., Stanford cars), using the techniques described herein leads to retrieval of more accurate 3D models from an unseen database than the state-of-the-art from a database seen during training.

Figure 7:
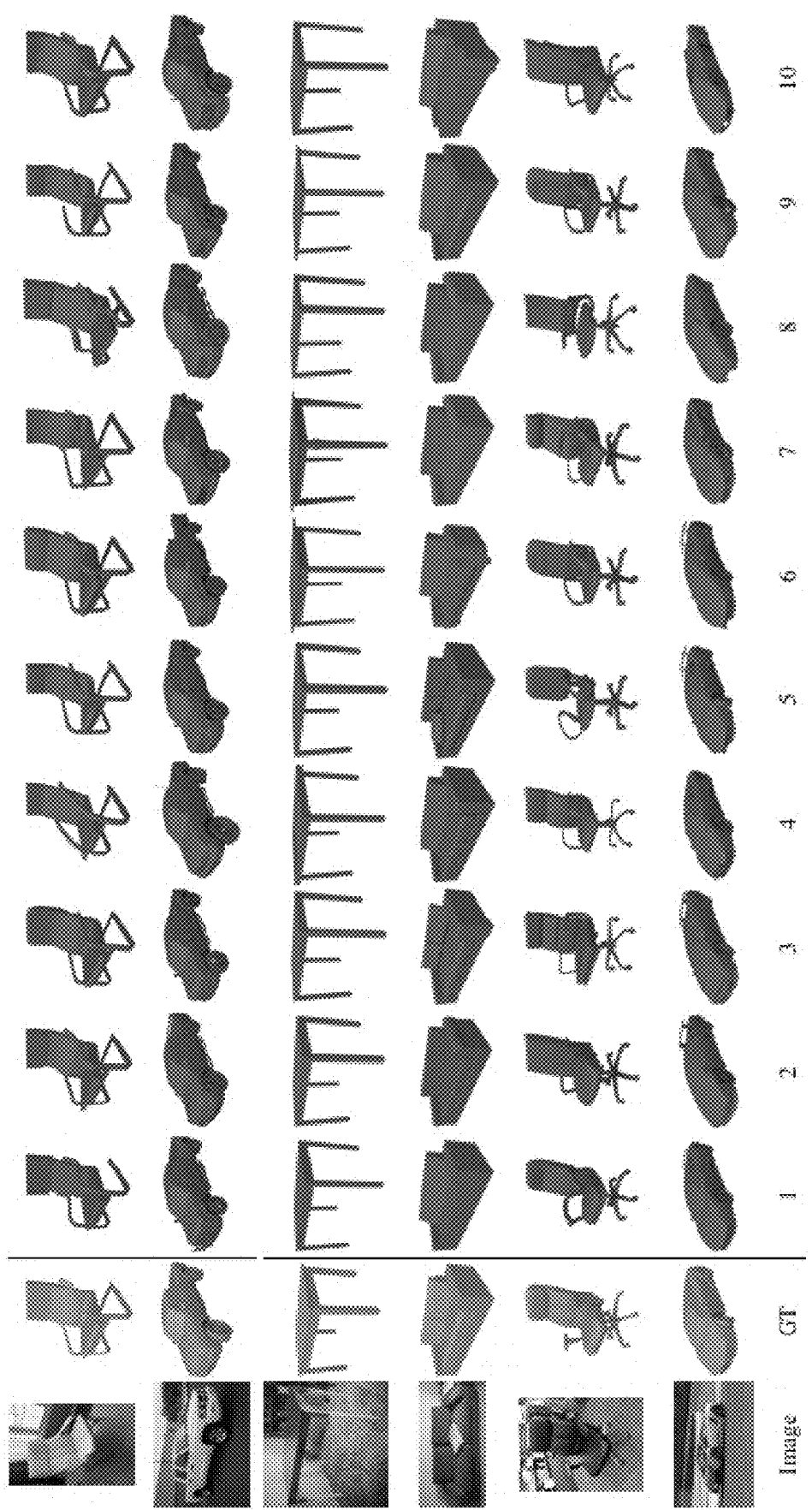
FIG. 7 is a diagram illustrating an example of results generated using the model retrieval system, in accordance with some examples.

The quantitative performance of the model retrieval techniques described herein is also reflected in qualitative results. For example, FIG. 7 shows qualitative results for 3D model retrieval from ShapeNet. From left to right, FIG. 7 shows the input image, the ground truth (GT) 3D model and the top ten ranked 3D models. Considering the top ten ranked 3D models, it can be observed that the retrieved models have a consistent and accurate overall 3D shape and geometry.

Figure 8:
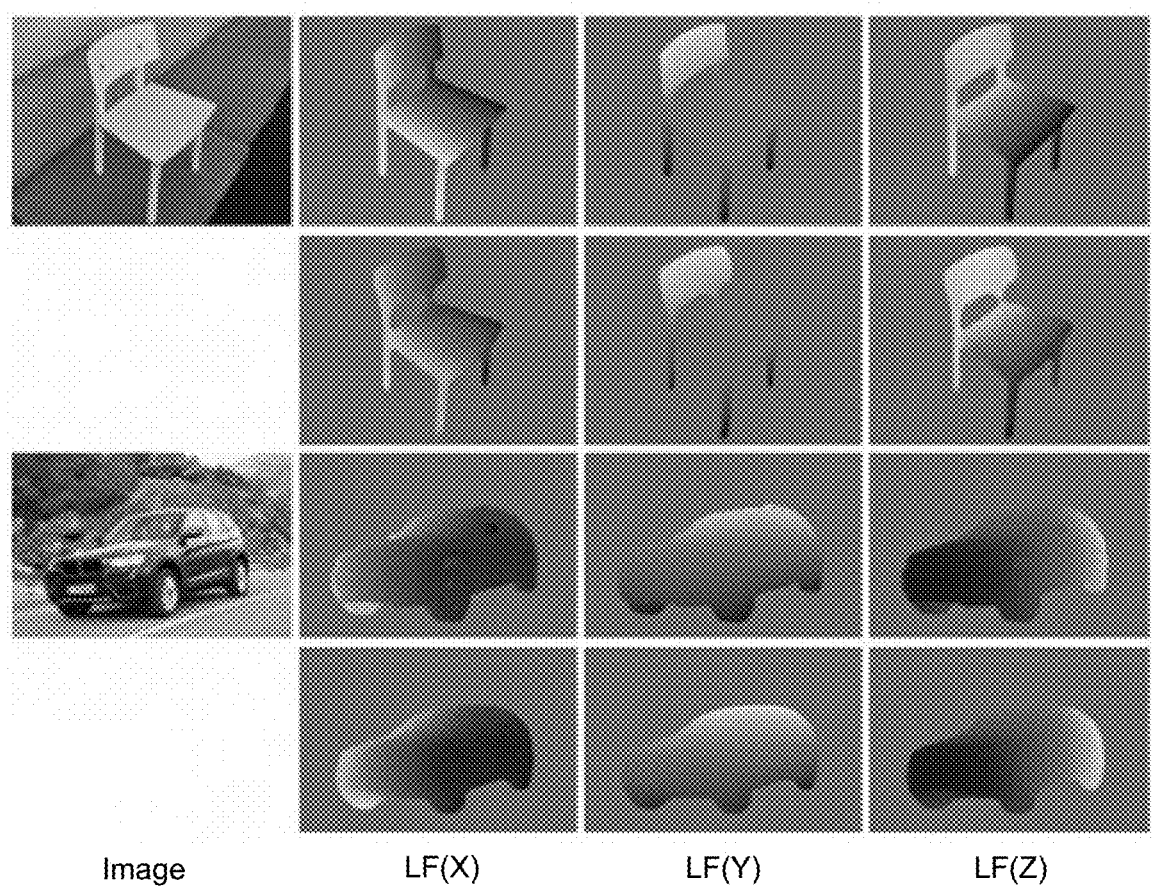
FIG. 8 is a diagram illustrating another example of results generated using the model retrieval system, in accordance with some examples.
Figure 9A:
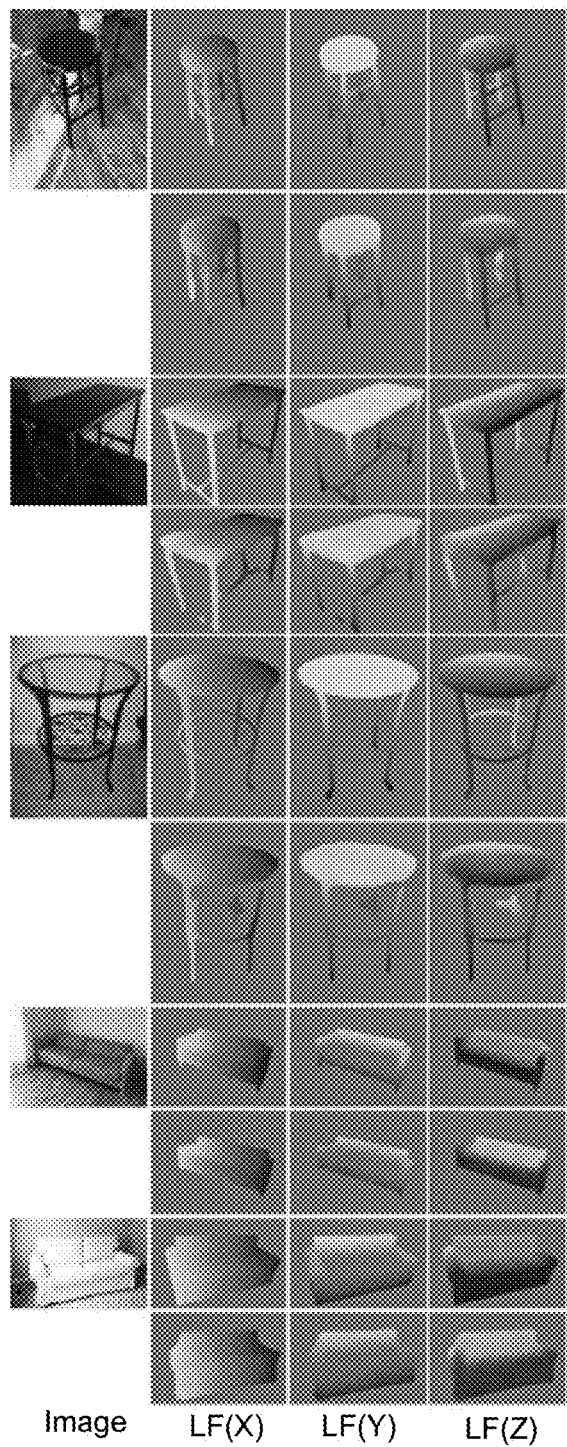
FIG. 9A and FIG. 9B are diagrams illustrating other examples of results generated using the model retrieval system, in accordance with some examples.
Figure 9B:
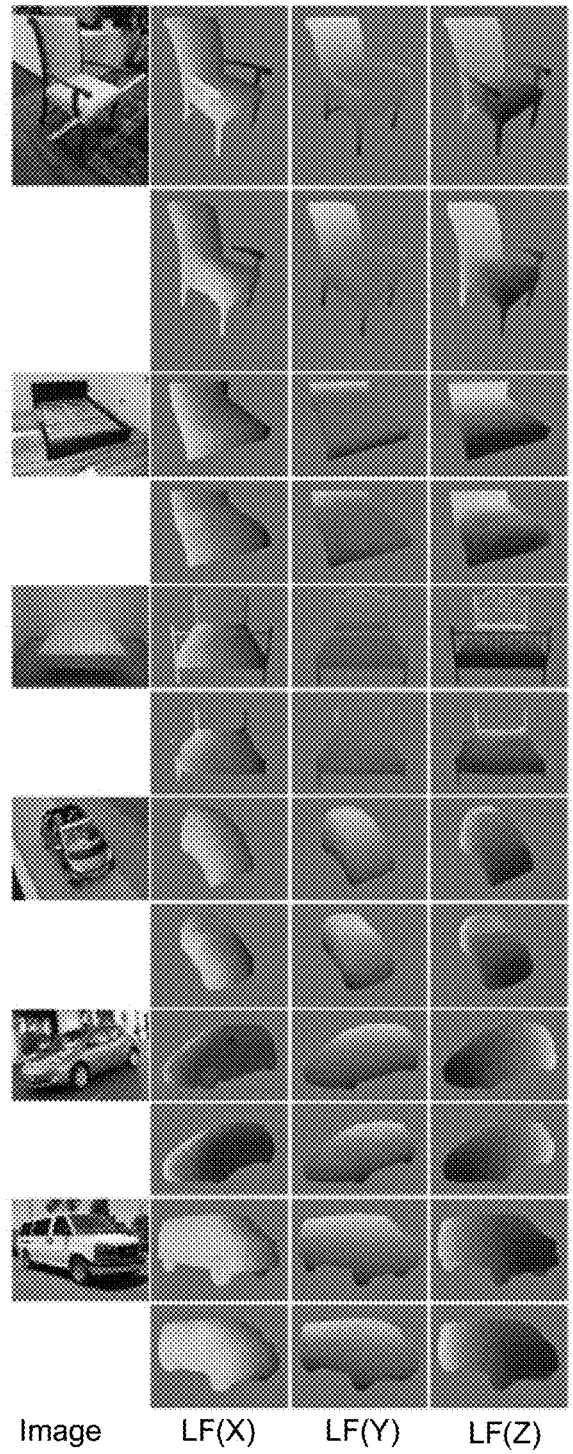
Figure 10A:
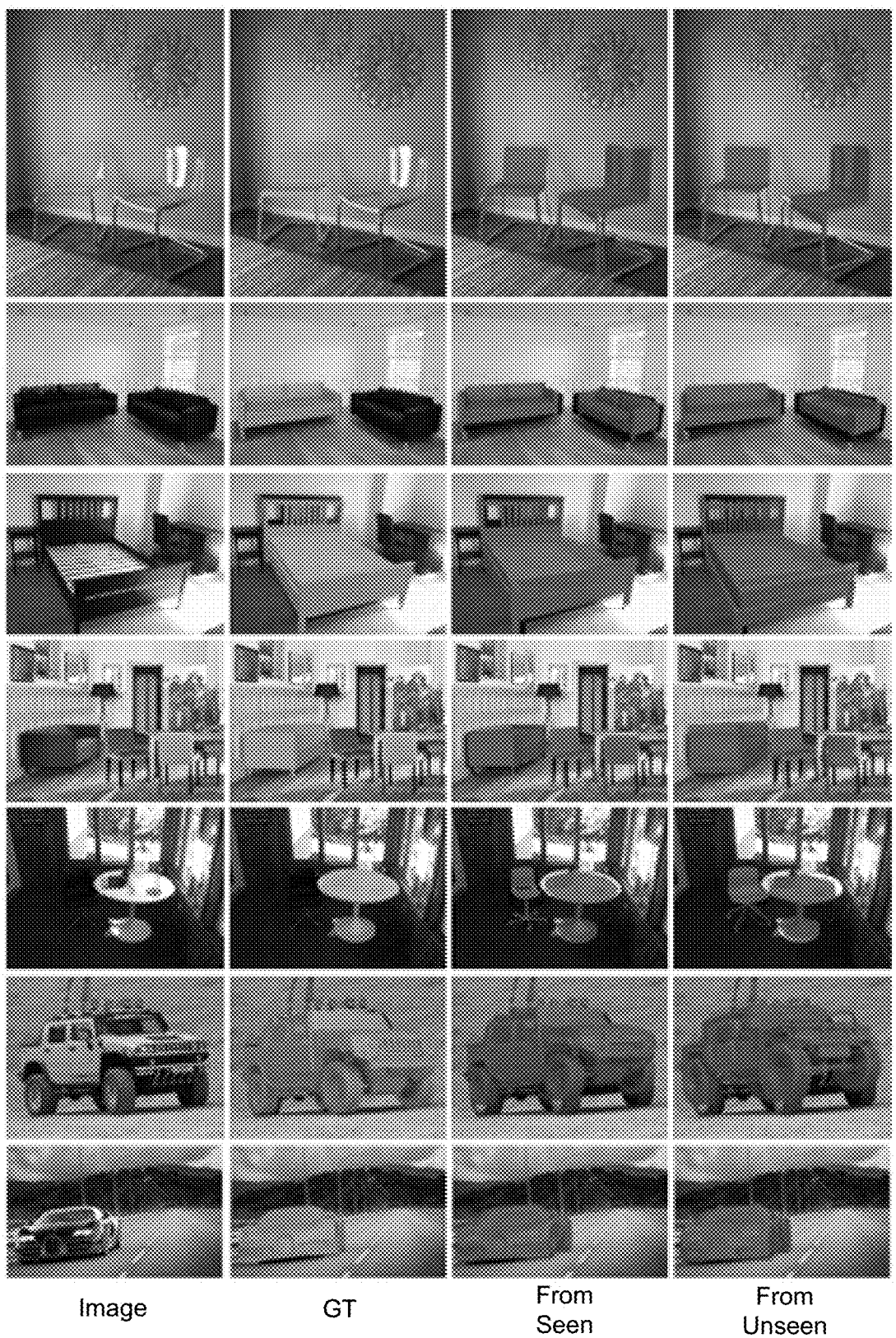
FIG. 10A-FIG. 10E are diagrams illustrating other examples of results generated using the model retrieval system, in accordance with some examples.
Figure 10B:
Figure 10C:
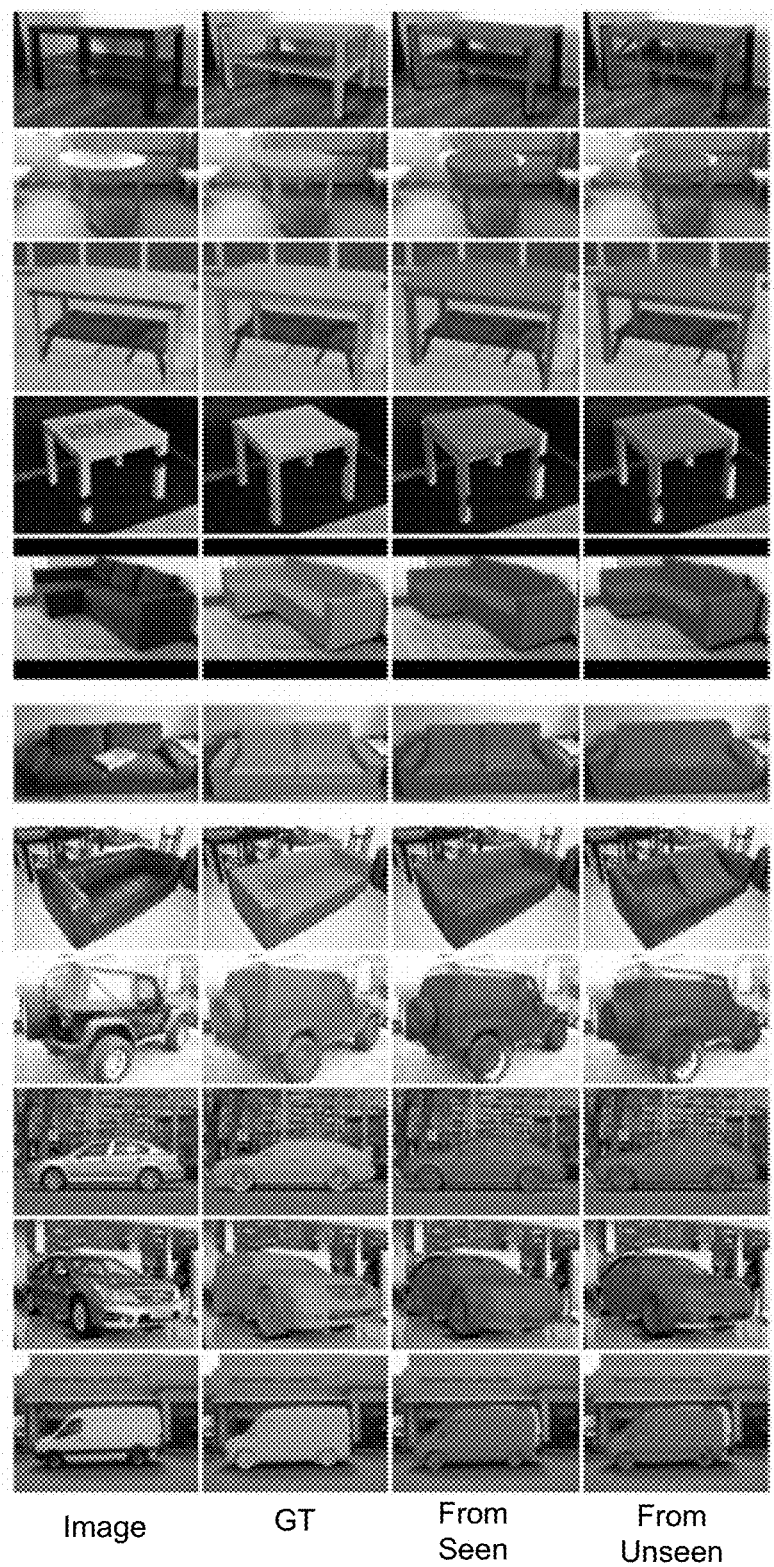
Figure 10D:
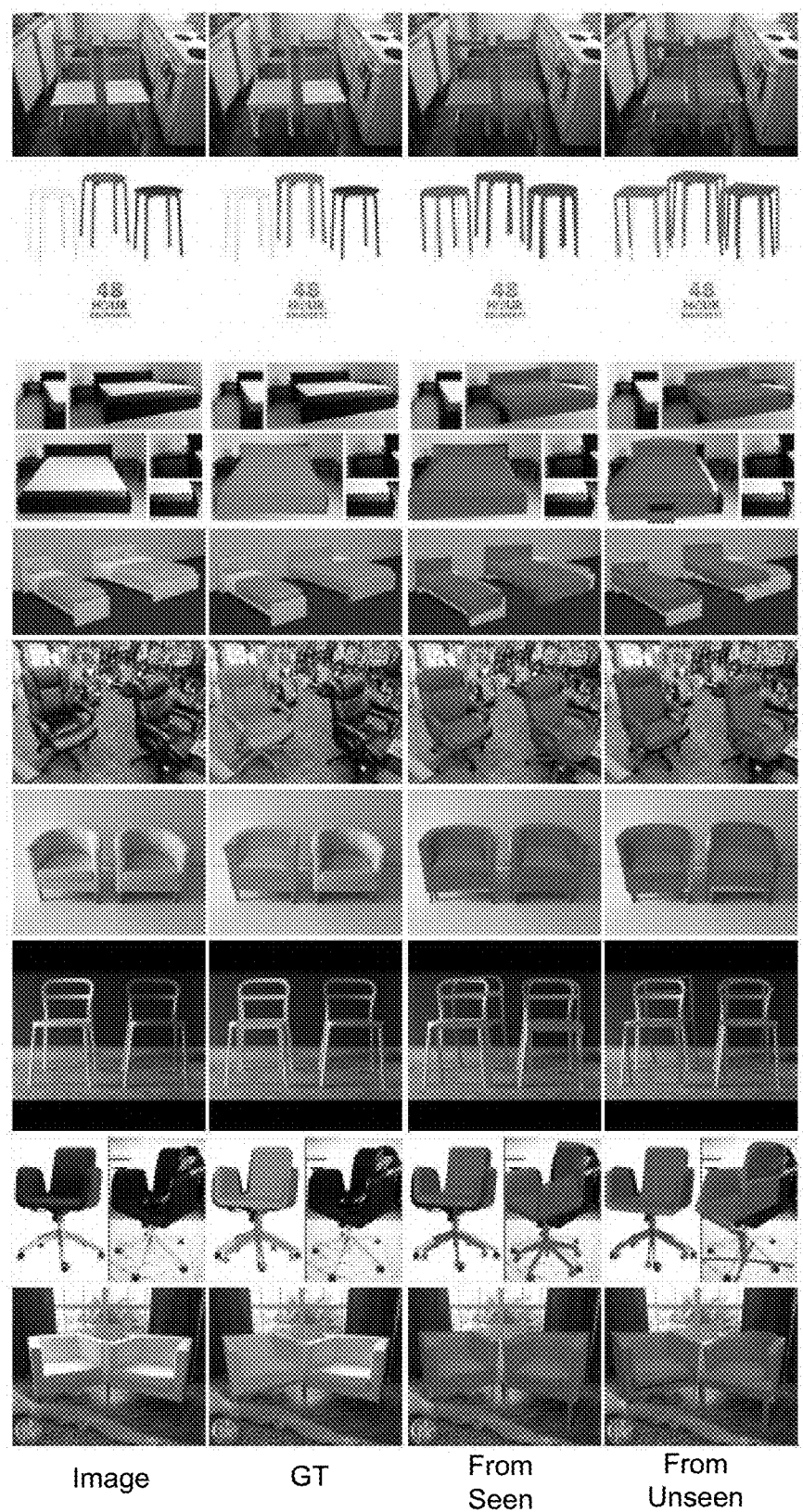
Figure 10E:
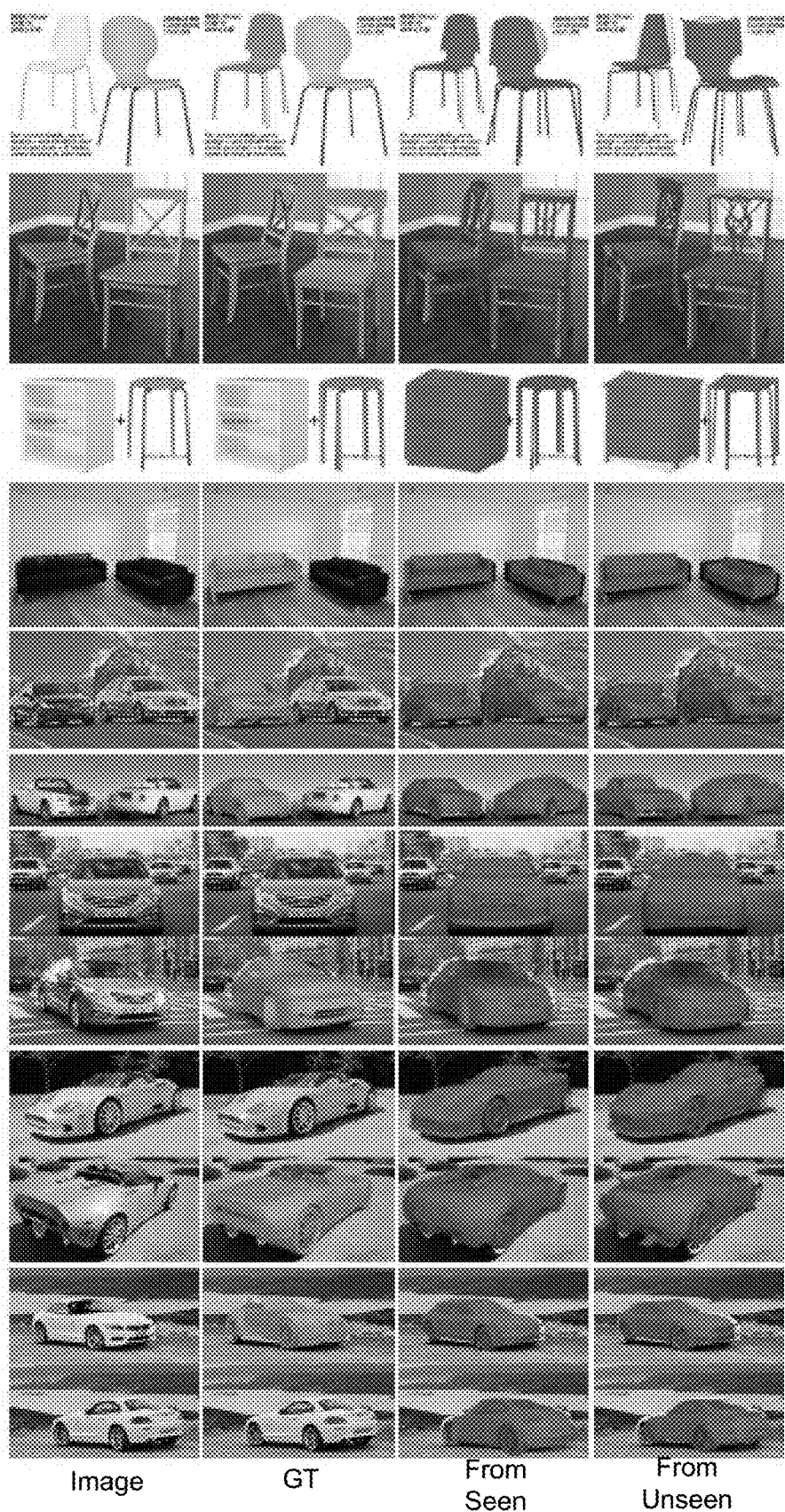

FIG. 8 shows qualitative examples of the location fields predicted using the LF-CNN 608. FIG. 9A and FIG. 9B show further qualitative examples of location fields predicted using the LF-CNN 608. For each example image (e.g., the chair and car in the left-most column of FIG. 8), the top row shows the ground truth and the bottom row shows the predicted location field. The overall 3D shape is recovered well, while in some cases fine-grained details, like the side mirrors of the car, are missed.

FIG. 10A, FIG. 10B, FIG. 10C, FIG. 10D, and FIG. 10E present examples for 3D model retrieval from both seen and unseen databases. It is also shown that location fields provide all relevant information to also compute the 3D pose of objects. To compute the 3D pose of an object, 2D-3D correspondences can be sampled from the location fields and a PnP problem can be solved during inference, as described above. As shown in FIG. 10A-FIG. 10E, the retrieved 3D model is projected onto each image using a 3D pose computed from the predicted location field by solving a PnP problem. For the ground truth 3D model, the ground truth 3D pose is used. The location fields provide all relevant information to jointly address both tasks. The projections onto the image show that both the retrieved 3D models and the computed 3D poses are highly accurate.

As noted above, to understand which aspects of the techniques described herein are crucial for performance, an ablation study was conducted. For this purpose, experiments were performed on Pix3D, which is the most challenging dataset, because it provides multiple categories and has the largest variation in object scale and pose. The mean performance across all categories is provided in Table 2 below.

If the CNN models are trained without synthetic data (e.g., the LFD-CNN is trained purely on predicted location fields), the performance decreases significantly. For example, since training data is limited, location fields are not found from many different 3D poses during training.

Next, if location fields are predicted, rendered, and processed at half of the proposed resolution (28×28×3), the performance also drops significantly. In this case, fine-grained structures, e.g., thin legs of a chair, cannot be recovered in the location fields due to the limited spatial resolution.

Optimizing a pure softmax loss without the proposed combination of Center loss and Triplet-Center loss (as described above) results in a small performance decrease.

This shows that the proposed Descriptor loss (see $L_D$ equation above) learns more discriminative embeddings than classification alone.

Further, training without Feature Mapping only slightly decreases performance. This is in part due to the fact that the domain gap is addressed by aggressively augmenting and degenerating rendered location fields during training of the LFD-CNN to simulate predicted location fields.

Also, if the learned center descriptors are not used, but instead use multi-view descriptors for matching, the performance almost remains the same. In this case, a test can match against 100 descriptors computed from location fields rendered under different 3D poses instead of a single center descriptor for each 3D model. This exhaustive comparison has a much higher computational complexity than the techniques described herein. In fact, using center descriptors is not only significantly faster but also achieves better performance considering dHAU. This experiment confirms that the techniques described herein for determining location field descriptors indeed learns pose invariant 3D shape descriptors.

TABLE 3

| Method | $Acc_{Top-1}$ | $d_{HAU}$ | $d_{IOU}$ |
| --- | --- | --- | --- |
| Current Method without synthetic data | 55.0% | 0.0219 | 0.7156 |
| Current Method with half-res location fields | 58.7% | 0.0204 | 0.7370 |
| Current Method without (T)CL [19, 60] | 59.9% | 0.0175 | 0.7621 |
| Current Method without Mapping [42] | 60.0% | 0.0174 | 0.7630 |
| Current Method with multi-view | 60.9% | 0.0173 | 0.7686 |
| Current Method | 60.7% | 0.0171 | 0.7663 |

Table 3 above shows the results of the ablation study of the techniques described herein on the Pix3D dataset. Exploiting synthetic data in the form of rendered location fields during training and employing location fields with sufficient resolution to capture thin structures are important aspects for increasing performance.

As described herein, learning a common embedding of 3D models and images for single image 3D model retrieval is difficult due to limited training data and the domain gap between real and synthetic data. The techniques described herein can map 3D models and images to a common low-level representation in the form of location fields, from which pose invariant 3D shape descriptors (location field descriptors) can be computed. In this way, the domain gap is bridged and benefits are obtained from training on synthetic data.

Figure 11:
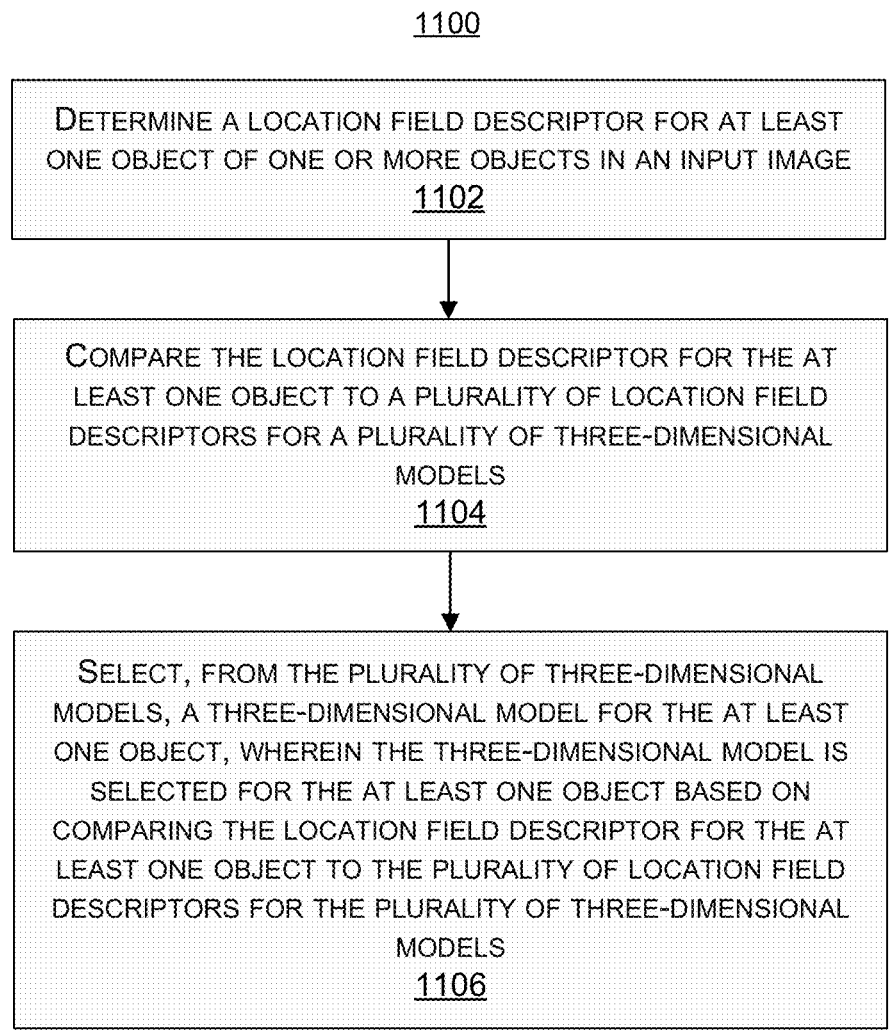
FIG. 11 is a flowchart illustrating an example of a process of determining one or more 3D models, in accordance with some examples.

FIG. 11 illustrates an example of a process 1100 of determining one or more three-dimensional models representing one or more objects (e.g., one model for each object) using the techniques described herein. At block 1102, the process 1100 includes determining a location field descriptor for at least one object of one or more objects in an input image. An example input image 602 containing an object is shown in FIG. 6. In some examples, the process 1100 can include obtaining the input image including the one or more objects.

In some examples, the location field descriptor for the at least one object is based on three-dimensional surface coordinate information for a plurality of pixels associated with the at least one object in the input image. The location field descriptor for the at least one object can be a feature vector with values defining a shape of the at least one object. In some cases, the location field descriptor for the at least one object can be determined from a location field for the at least one object. For instance, in some examples, the process 1100 can include generating, from the input image, a location field for at least one object of the one or more objects. The location field for the at least one object can include a 3D surface coordinate for each pixel associated with the at least one object in the input image. In some examples, a location field can be generated for each object in the image when multiple objects are present in the image (e.g., a first location field for a first object, a second location field for a second object, and so on). In some examples, a location field can be generated for less than all objects in the image when multiple objects are present in the image.

In some examples, the location field generated for the at least one object is generated using a first convolutional neural network (e.g., the LF-CNN 608 from FIG. 6) that uses the input image as input. In some examples, the process 1100 can include detecting, using the first convolutional neural network, the one or more objects from the input image. For example, as described above, the LF-CNN 608 can be a Mask-RCNN with at least a mask branch for generating a segmentation mask, an object detection branch for detecting one or more objects in an image, and a customized output branch for estimating location fields of the detected one or more objects.

In some cases, for each object for which a location field is generated, a location field descriptor can also be determined from that location field. In some cases, the location field descriptor for the at least one object (and in some cases the location field descriptors for the 3D models) is determined using a second convolutional neural network (e.g., the LFD-CNN 612 from FIG. 6) that uses the location field for the at least one object as input.

At block 1104, the process 1100 includes comparing the location field descriptor for the at least one object to a plurality of location field descriptors for a plurality of 3D models. Each 3D model of the plurality of 3D models can include a 3D mesh representing an object.

In some examples, the process 1100 can include obtaining the plurality of 3D models, and determining the plurality of location field descriptors for the plurality of 3D models, in which case a location field descriptor is determined for each 3D model of the plurality of 3D models (e.g., at least a first location field descriptor for a first 3D model, at least a second location field descriptor for a second 3D model, and so on). In some examples, the process 1100 can include storing the plurality of location field descriptors for the plurality of 3D models in a database.

In some examples, the process 1100 can include generating a plurality of location fields for the plurality of 3D models, in which case a location field is generated for each 3D model of the plurality of 3D models (e.g., at least a first location field for a first 3D model, at least a second location field for a second 3D model, and so on). In some examples, the process 1100 can include generating a plurality of location fields for a 3D model of the plurality of 3D models. A first location field of the plurality of location fields can be generated for a first pose of the 3D model, and a second location field of the plurality of location fields can be generated for a second pose of the 3D model. In some cases, generating a location field for a 3D model of the plurality of 3D models includes generating a rendering of the 3D model.

For example, generating the rendering of the 3D model can include, in some implementations, rasterizing a 3D mesh of the 3D model to determine a 3D surface coordinate for each vertex of the 3D mesh, and interpolating 3D surface coordinates for points between vertices of the 3D mesh, as described above.

In some cases, if multiple location fields are generated for a 3D model (e.g., in different poses), a location field descriptor can be generated for each of the location fields. In some cases, if multiple location fields are generated for a 3D model (e.g., in different poses), a single pose-invariant center location field descriptor can be generated for each 3D model. For example, the process 1100 can include determining, for each 3D model of the plurality of 3D models, a pose-invariant center descriptor. In such an example, the plurality of location field descriptors that are compared to the location field descriptor for the at least one object include a plurality of pose-invariant center descriptors. In some cases, the plurality of pose-invariant center descriptors are determined using the second convolutional neural network (e.g., the LFD-CNN 612 from FIG. 6).

At block 1106, the process 1100 includes selecting, from the plurality 3D models, a 3D model for the at least one object. For example, a 3D model can be selected for each object for which a location field and a location field descriptor is generated. The 3D model is selected for the at least one object based on comparing the location field descriptor for the at least one object to the plurality of location field descriptors for the plurality of 3D models. In some examples, the 3D model is selected for the at least one object based on the location field descriptor of the at least one object having a closest match with a location field descriptor of the 3D model. For example, comparing the location field descriptor of the at least one object to the plurality of location field descriptors for the plurality of 3D models can include determining distances between the location field descriptor for the at least one object and the plurality of location field descriptors for the plurality of 3D models. The 3D model can be selected for the at least one object based on the location field descriptor of the at least one object having a closest distance with a location field descriptor of the 3D model. The distances can include any suitable distance metric, such as Euclidean distances, Cosine distances, Manhattan distances, Jaccard distances, or other suitable distance metric.

The selected 3D model can be used for many applications. In some examples, the 3D model can be used as an augmentation to the input image. For instance, the process 1100 can include generating an output image based on the selected 3D model and the input image. In some examples, the process 1100 can include receiving a user input to manipulate the selected 3D model, and adjusting one or more of a pose, a location, or a property of the selected 3D model in an output image based on the user input. In one example, the process 1100 can receive user input requesting movement of the object (represented by the 3D model) from a first location (and/or from a first pose) to a second location (and/or to a second pose). In response, the process 1100 can adjust the location of the 3D model from the first location (and/or from the first pose) to the second location (and/or to the second pose) in an output image. In another example, as described above, data can be provided for a 3D model that defines semantic information for the 3D model. The semantic properties defined by the data can allow a user to interact with the 3D model through a user interface. In such cases, one or more of the pose, the location, or the property of the selected three-dimensional model can be adjusted based on the semantic information defined for the selected 3D model. The property of the 3D model can include an appearance of the 3D model (e.g., texture, color, sheen, reflectance, among others), physical movement of the 3D model (e.g., a range of possible movements, an amount the 3D model can be manipulated, such as stretched and/or compressed, among others), actions that can be performed the 3D model (e.g., a 3D model of glass that can be broken or shattered, among others), any combination thereof, and/or other semantic properties.

In some examples, the process 1100 can include obtaining an additional input image. The additional input image includes the at least one object in a different pose, in a different location, or both a different pose and location than a pose and/or location of the at least one object in the input image that was obtained at block 1102. The process 1100 can adjust the pose, the location, or both the pose and the location of the selected 3D model in an output image based on a difference between the pose and/or location of the at least one object in the additional input image and the pose and/or location of the at least one object in the input image. For example, if the at least object (represented by the 3D model) moves from a first location (and/or from a first pose) in the input image to a second location (and/or to a second pose) in the additional input image, the process 1100 can adjust the location of the 3D model to the second location (and/or to the second pose) in an output image.

Figure 12:
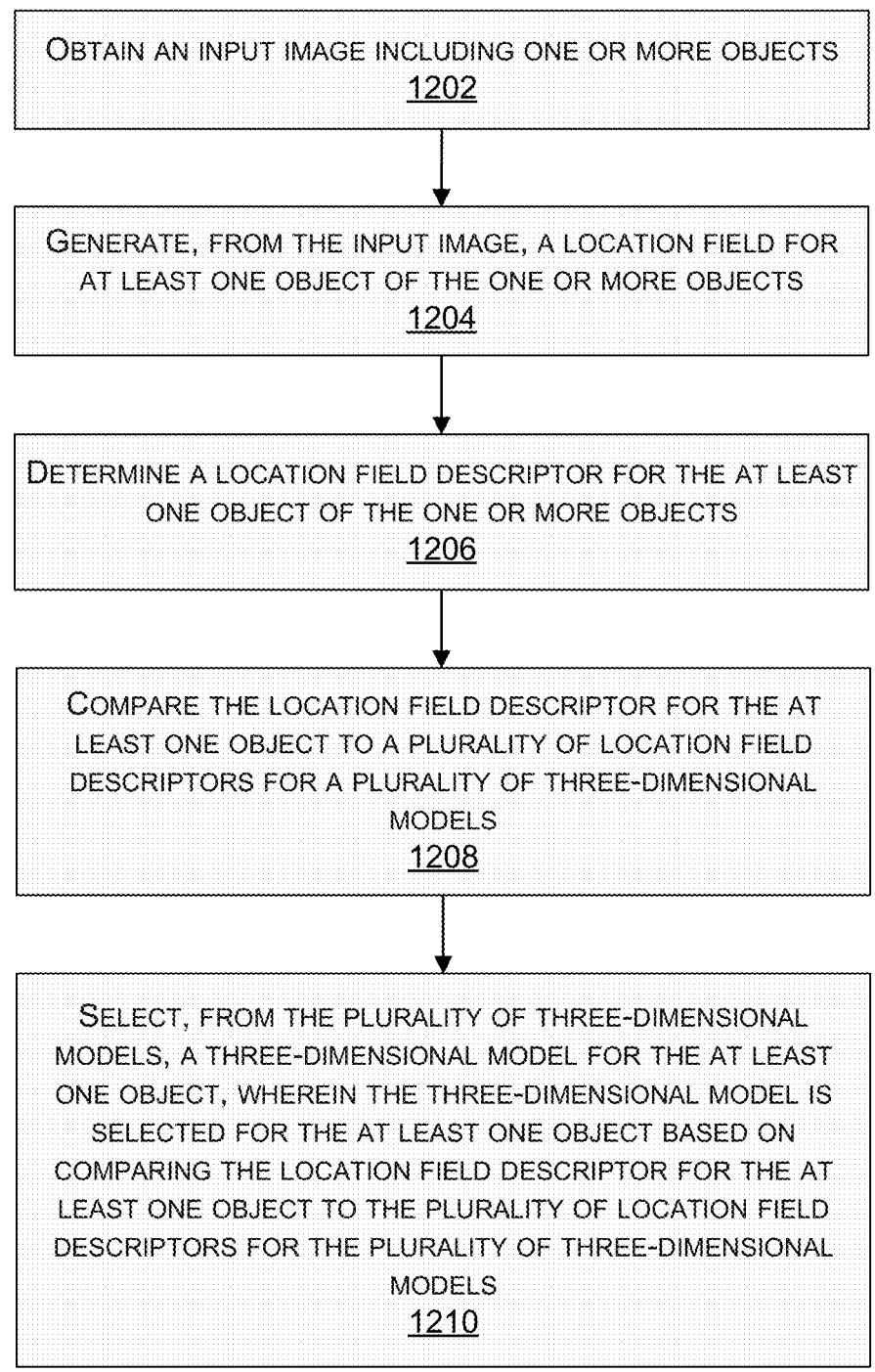
FIG. 12 is a flowchart illustrating an example of another process of determining one or more 3D models, in accordance with some examples.

FIG. 12 illustrates an example of a process 1200 of determining one or more three-dimensional models representing one or more objects (e.g., one model for each object) using the techniques described herein. At block 1202, the process 1200 includes obtaining an input image including one or more objects. An example input image 602 containing an object is shown in FIG. 6.

At block 1204, the process 1200 includes generating, from the input image, a location field for at least one object of the one or more objects. As previously described, the location field for the at least one object includes a 3D surface coordinate for each pixel associated with the at least one object in the input image. In some examples, a location field can be generated for each object in the image when multiple objects are present in the image (e.g., a first location field for a first object, a second location field for a second object, and so on). In some examples, a location field can be generated for less than all objects in the image when multiple objects are present in the image.

In some examples, the location field generated for the at least one object is generated using a first convolutional neural network (e.g., the LF-CNN 608 from FIG. 6) that uses the input image as input. In some examples, the process 1200 can include detecting, using the first convolutional neural network, the one or more objects from the input image. For example, as described above, the LF-CNN 608 can be a Mask-RCNN with at least a mask branch for generating a segmentation mask, an object detection branch for detecting one or more objects in an image, and a customized output branch for estimating location fields of the detected one or more objects.

At block 1206, the process 1200 includes determining a location field descriptor for the at least one object of the one or more objects. The location field descriptor for the at least one object can be determined from the location field for the at least one object. For example, for each object for which a location field is generated, a location field descriptor can also be determined from that location field. The location field descriptor for the at least one object can be a feature vector with values defining a shape of the at least one object.

In some cases, the location field descriptor for the at least one object (and in some cases the location field descriptors for the 3D models) is determined using a second convolutional neural network (e.g., the LFD-CNN 612 from FIG. 6) that uses the location field for the at least one object as input.

At block 1208, the process 1200 includes comparing the location field descriptor for the at least one object to a plurality of location field descriptors for a plurality of 3D models. Each 3D model of the plurality of 3D models can include a 3D mesh representing an object.

In some examples, the process 1200 can include obtaining the plurality of 3D models, and generating a plurality of location fields for the plurality of 3D models, in which case a location field is generated for each 3D model of the plurality of 3D models (e.g., at least a first location field for a first 3D model, at least a second location field for a second 3D model, and so on). In some examples, the process 1200 can include generating a plurality of location fields for a 3D model of the plurality of 3D models. A first location field of the plurality of location fields can be generated for a first pose of the 3D model, and a second location field of the plurality of location fields can be generated for a second pose of the 3D model. In some cases, generating a location field for a 3D model of the plurality of 3D models includes generating a rendering of the 3D model. For example, generating the rendering of the 3D model can include, in some implementations, rasterizing a 3D mesh of the 3D model to determine a 3D surface coordinate for each vertex of the 3D mesh, and interpolating 3D surface coordinates for points between vertices of the 3D mesh, as described above.

The process 1200 can further include determining the plurality of location field descriptors for the plurality of 3D models, in which case a location field descriptor is determined for each 3D model of the plurality of 3D models (e.g., at least a first location field descriptor for a first 3D model, at least a second location field descriptor for a second 3D model, and so on). In some examples, the process 1200 can include storing the plurality of location field descriptors for the plurality of 3D models in a database.

In some cases, if multiple location fields are generated for a 3D model (e.g., in different poses), a location field descriptor can be generated for each of the location fields. In some cases, if multiple location fields are generated for a 3D model (e.g., in different poses), a single pose-invariant center location field descriptor can be generated for each 3D model. For example, the process 1200 can include determining, for each 3D model of the plurality of 3D models, a pose-invariant center descriptor. In such an example, the plurality of location field descriptors that are compared to the location field descriptor for the at least one object include a plurality of pose-invariant center descriptors. In some cases, the plurality of pose-invariant center descriptors are determined using the second convolutional neural network (e.g., the LFD-CNN 612 from FIG. 6).

At block 1210, the process 1200 includes selecting, from the plurality 3D models, a 3D model for the at least one object. For example, a 3D model can be selected for each object for which a location field and a location field descriptor is generated. The 3D model is selected for the at least one object based on comparing the location field descriptor for the at least one object to the plurality of location field descriptors for the plurality of 3D models. In some examples, the 3D model is selected for the at least one object based on the location field descriptor of the at least one object having a closest match with a location field descriptor of the 3D model. For example, comparing the location field descriptor of the at least one object to the plurality of location field descriptors for the plurality of 3D models can include determining distances between the location field descriptor for the at least one object and the plurality of location field descriptors for the plurality of 3D models. The 3D model can be selected for the at least one object based on the location field descriptor of the at least one object having a closest distance with a location field descriptor of the 3D model. The distances can include any suitable distance metric, such as Euclidean distances, Cosine distances, Manhattan distances, Jaccard distances, or other suitable distance metric.

The selected 3D model can be used for many applications. In some examples, the 3D model can be used as an augmentation to the input image. For instance, the process 1200 can include generating an output image based on the selected 3D model and the input image. In some examples, the process 1200 can include receiving a user input to manipulate the selected 3D model, and adjusting one or more of a pose or a location of the selected 3D model in an output image based on the user input. In one example, the process 1200 can receive user input requesting movement of the object (represented by the 3D model) from a first location (and/or from a first pose) to a second location (and/or to a second pose). In response, the process 1200 can adjust the location of the 3D model from the first location (and/or from the first pose) to the second location (and/or to the second pose) in an output image. In another example, as described above, data can be provided for a 3D model that defines semantic information for the 3D model. The semantic properties defined by the data can allow a user to interact with the 3D model through a user interface. In such cases, one or more of the pose, the location, or the property of the selected three-dimensional model can be adjusted based on the semantic information defined for the selected 3D model. The property of the 3D model can include an appearance of the 3D model (e.g., texture, color, sheen, reflectance, among others), physical movement of the 3D model (e.g., a range of possible movements, an amount the 3D model can be manipulated, such as stretched and/or compressed, among others), actions that can be performed the 3D model (e.g., a 3D model of glass that can be broken or shattered, among others), any combination thereof, and/or other semantic properties.

In some examples, the process 1200 can include obtaining an additional input image. The additional input image includes the at least one object in a different pose, in a different location, or both a different pose and location than a pose and/or location of the at least one object in the input image that was obtained at block 1202. The process 1200 can adjust the pose, the location, or both the pose and the location of the selected 3D model in an output image based on a difference between the pose and/or location of the at least one object in the additional input image and the pose and/or location of the at least one object in the input image. For example, if the at least object (represented by the 3D model) moves from a first location (and/or from a first pose) in the input image to a second location (and/or to a second pose) in the additional input image, the process 1200 can adjust the location of the 3D model to the second location (and/or to the second pose) in an output image.

Figure 13:
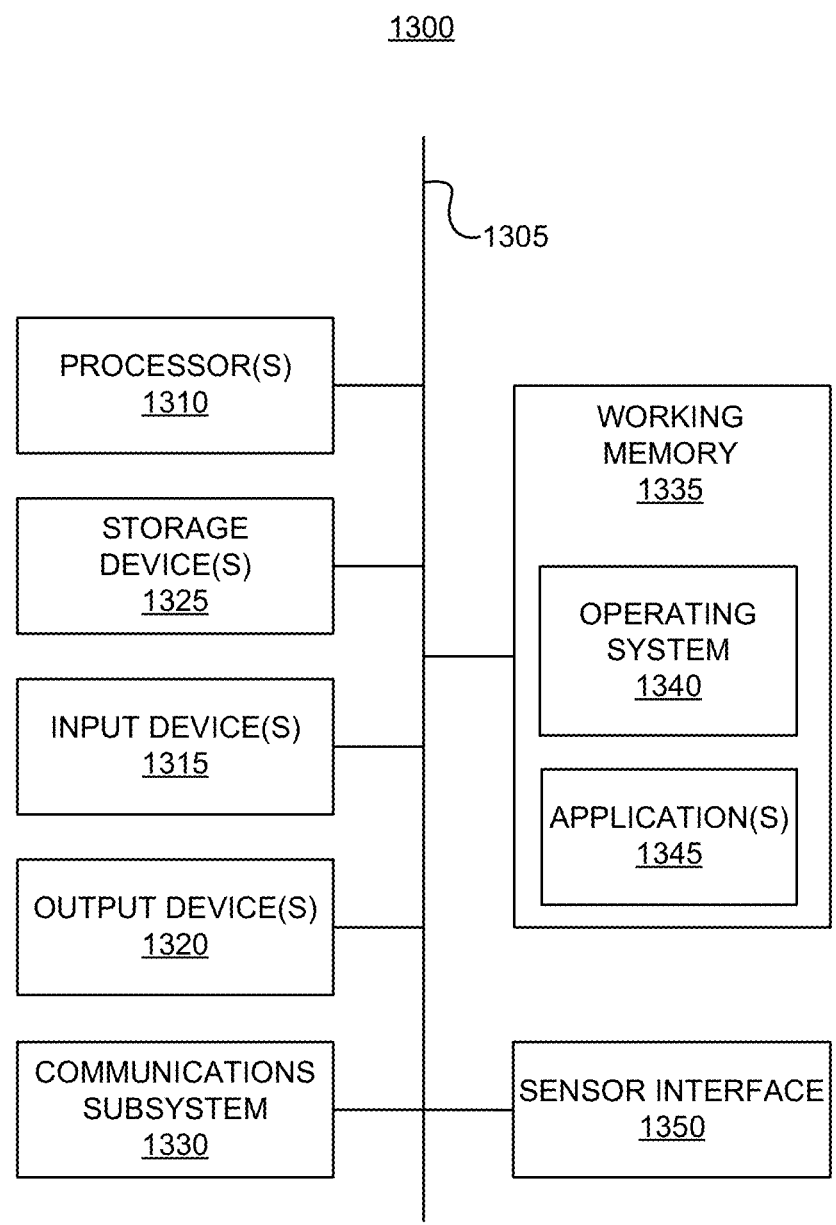
FIG. 13 illustrates an example of a computing system in which one or more embodiments may be implemented.

In some examples, the processes 1100 and 1200 may be performed by a computing device or an apparatus, such as a computing device having the computing device architecture 1300 shown in FIG. 13. In one illustrative example, the processes 1100 and 1200 can be performed by a computing device with the computing device architecture 1300 implementing the model retrieval system 304 shown in FIG. 3. In some cases, the computing device or apparatus may include an input device, a location field generation engine, a location field rendering engine, a location field descriptor generation engine, a descriptor matching engine, an output device, one or more processors, one or more microprocessors, one or more microcomputers, and/or other component(s) that is/are configured to carry out the steps of processes 1100 and 1200. In some examples, the computing device or apparatus may include a camera configured to capture images. For example, the computing device may include a camera device. As another example, the computing device may include a mobile device with a camera (e.g., a mobile phone or tablet including a camera, or other type of device with a camera). In some cases, the camera device can include communications transceiver and/or a video codec. In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or any other suitable data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Processes 1100 and 1200 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1100 and 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 illustrates an example computing device 1300 incorporating parts of a computing device that can be used to performing one or more of the techniques described herein. A computing device as illustrated in FIG. 13 may be incorporated as part of any computerized system, herein. For example, computing device 1300 may represent some of the components of a mobile device, or a computing device executing a 3D model retrieval system or tool. Examples of a computing device 1300 include, but are not limited to, desktops, workstations, personal computers, supercomputers, video game consoles, tablets, smart phones, laptops, netbooks, or other portable devices. FIG. 13 provides a schematic illustration of one embodiment of a computing device 1300 that may perform the methods provided by various other embodiments, as described herein, and/or may function as the host computing device, a remote kiosk/terminal, a point-of-sale device, a mobile multifunction device, a set-top box and/or a computing device. FIG. 13 is meant only to provide a generalized illustration of various components, any or all of which may be utilized as appropriate. FIG. 13, therefore, broadly illustrates how individual system elements may be implemented in a relatively separated or relatively more integrated manner.

The computing device 1300 is shown comprising hardware elements that may be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which may include without limitation a camera, sensors 1350, a mouse, a keyboard and/or the like; and one or more output devices 1320, which may include without limitation a display unit, a printer and/or the like.

The computing device 1300 may further include (and/or be in communication with) one or more non-transitory storage devices 1325, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1300 might also include a communications subsystem 1330. The communications subsystem 1330 may include a transceiver for receiving and transmitting data or a wired and/or wireless medium. The communications subsystem 1330 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1330 may permit data to be exchanged with a network (such as the network described below, to name one example), other computing devices, and/or any other devices described herein. In many embodiments, the computing device 1300 will further comprise a non-transitory working memory 1335, which may include a RAM or ROM device, as described above.

The computing device 1300 may comprise software elements, shown as being currently located within the working memory 1335, including an operating system 1340, device drivers, executable libraries, and/or other code, such as one or more application programs 1345, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computing device, such as computing device 1300. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1300 and/or might take the form of source and/or installable code, which, upon compilation and/or installation on the computing device 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1300 such as network input/output devices may be employed.

Some embodiments may employ a computing device (such as the computing device 1300) to perform methods in accordance with the disclosure. For example, some or all of the procedures of the described methods may be performed by the computing device 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "one or more of A or B" means A, B, or A and B. In another example, claim language reciting "one or more of A, B, or C" means A, B, C, or A and B, or A and C, or B and C, or A and B and C. The language "at least one of" a set and/or "one or more" of a set does not limit the set to the items listed in the set. For example, claim language reciting "one or more of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of determining one or more three-dimensional models, the method comprising:
   obtaining an input image including at least one object;
   generating, from the input image, three-dimensional surface coordinate information for a plurality of pixels associated with the at least one object in the input image;
   generating, based on the three-dimensional surface coordinate information, at least one location field descriptor for the at least one object in the input image, the at least one location field descriptor including information defining a shape of the at least one object;
   comparing the at least one location field descriptor for the at least one object to a plurality of location field descriptors including information defining one or more shapes of a plurality of three-dimensional models; and
   selecting, from the plurality of three-dimensional models, a three-dimensional model for the at least one object, wherein the three-dimensional model is selected for the at least one object based on comparing the at least one location field descriptor for the at least one object to the plurality of location field descriptors for the plurality of three-dimensional models.

2. The method of claim 1, wherein the three-dimensional model is selected for the at least one object based on the at least one location field descriptor of the at least one object having a closest match with a location field descriptor of the three-dimensional model.

3. The method of claim 1, wherein comparing the at least one location field descriptor for the at least one object to the plurality of location field descriptors for the plurality of three-dimensional models includes:
   determining distances between the at least one location field descriptor for the at least one object and the plurality of location field descriptors for the plurality of three-dimensional models.

4. The method of claim 3, wherein the three-dimensional model is selected for the at least one object based on the at least one location field descriptor of the at least one object having a closest distance with a location field descriptor of the three-dimensional model.

5. The method of claim 3, wherein the distances include Euclidean distances or Cosine distances.

6. The method of claim 1, wherein the information defining the shape of the at least one object in the input image includes a feature vector with values defining the shape of the at least one object.

7. The method of claim 1, wherein each three-dimensional model of the plurality of three-dimensional models includes a three-dimensional mesh representing an object.

8. The method of claim 1, further comprising:
   obtaining the plurality of three-dimensional models; and
   determining the plurality of location field descriptors for the plurality of three-dimensional models, wherein a location field descriptor is determined for each three-dimensional model of the plurality of three-dimensional models.

9. The method of claim 1, further comprising generating a location field for a three-dimensional model of the plurality of three-dimensional models.

10. The method of claim 9, wherein generating the location field for the three-dimensional model is based on a rendering of the three-dimensional model, wherein the rendering of the three-dimensional model is generated at least in part by:
    rasterizing a three-dimensional mesh of the three-dimensional model to determine a three-dimensional surface coordinate for each vertex of the three-dimensional mesh; and
    interpolating three-dimensional surface coordinates for points between vertices of the three-dimensional mesh.

11. The method of claim 1, wherein generating the three-dimensional surface coordinate information for the plurality of pixels includes generating a location field for the at least one object, the location field including the three-dimensional surface coordinate information.

12. The method of claim 11, wherein the location field is generated using a first convolutional neural network, the first convolutional neural network using the input image as input.

13. The method of claim 12, wherein the at least one location field descriptor for the at least one object is determined using a second convolutional neural network, the second convolutional neural network using the location field as input.

14. The method of claim 12, further comprising:
    detecting, using the first convolutional neural network, the at least one object from the input image.

15. The method of claim 1, further comprising:
    generating a plurality of location fields for a three-dimensional model of the plurality of three-dimensional models, a first location field of the plurality of location fields being generated for a first pose of the three-dimensional model, and a second location field of the plurality of location fields being generated for a second pose of the three-dimensional model.

16. The method of claim 1, further comprising:
    storing the plurality of location field descriptors for the plurality of three-dimensional models in a database.

17. The method of claim 1, further comprising:
    determining, for each three-dimensional model of the plurality of three-dimensional models, a pose-invariant center descriptor, wherein the plurality of location field descriptors that are compared to the at least one location field descriptor for the at least one object include a plurality of pose-invariant center descriptors.

18. The method of claim 17, wherein the plurality of pose-invariant center descriptors are determined using a convolutional neural network.

19. The method of claim 1, further comprising:
    generating an output image based on the selected three-dimensional model and the input image.

20. The method of claim 1, further comprising:
    receiving a user input to manipulate the selected three-dimensional model; and
    adjusting one or more of a pose, a location, or a property of the selected three-dimensional model in an output image based on the user input.

21. The method of claim 20, wherein one or more of the pose, the location, or the property of the selected three-dimensional model is adjusted based on semantic information defined for the selected three-dimensional model.

22. The method of claim 1, further comprising:
    obtaining an additional input image, the additional input image including the at least one object in one or more of a different pose or a different location than a pose or location of the at least one object in the input image; and
    adjusting one or more of a pose or a location of the selected three-dimensional model in an output image based on a difference between the pose or location of the at least one object in the additional input image and the pose or location of the at least one object in the input image.

23. An apparatus for determining one or more three-dimensional models, comprising:
   a memory configured to store one or more images; and
   a processor implemented in circuitry and configured to:
      obtain an input image including at least one object;
      generate, from the input image, three-dimensional surface coordinate information for a plurality of pixels associated with the at least one object in the input image;
      generate, based on the three-dimensional surface coordinate information, at least one location field descriptor for the at least one object in the input image, the at least one location field descriptor including information defining a shape of the at least one object;
      compare the at least one location field descriptor for the at least one object to a plurality of location field descriptors including information defining one or more shapes of a plurality of three-dimensional models; and
      select, from the plurality of three-dimensional models, a three-dimensional model for the at least one object, wherein the three-dimensional model is selected for the at least one object based on comparing the at least one location field descriptor for the at least one object to the plurality of location field descriptors for the plurality of three-dimensional models.

24. The apparatus of claim 23, wherein the three-dimensional model is selected for the at least one object based on the at least one location field descriptor of the at least one object having a closest match with a location field descriptor of the three-dimensional model.

25. The apparatus of claim 23, wherein the information defining the shape of the at least one object in the input image includes a feature vector with values defining the shape of the at least one object.

26. The apparatus of claim 23, wherein the processor is further configured to:
   generate an output image based on the selected three-dimensional model and the input image.

27. The apparatus of claim 23, wherein the processor is further configured to:
   receive a user input to manipulate the selected three-dimensional model; and
   adjust one or more of a pose, a location, or a property of the selected three-dimensional model in an output image based on the user input.

28. The apparatus of claim 23, wherein the apparatus comprises a mobile device with a camera for capturing the one or more images.

29. The apparatus of claim 23, further comprising a display for displaying the one or more images.

30. The apparatus of claim 23, wherein, to generate the three-dimensional surface coordinate information for the plurality of pixels, the processor is configured to generate a location field for the at least one object, the location field including the three-dimensional surface coordinate information.

* * * * *